(12) United States Patent
Park et al.

(10) Patent No.: US 12,498,241 B2
(45) Date of Patent: Dec. 16, 2025

(54) AR DISPLAY DEVICE FOR VEHICLE AND METHOD FOR OPERATING SAME

(71) Applicant: LG ELECTRONICS INC., Seoul (KR)

(72) Inventors: Jongtae Park, Seoul (KR); Jisuk Chae, Seoul (KR); Junghoon Son, Seoul (KR); Hyeonggyu Kim, Seoul (KR); Jieun Lee, Seoul (KR); Ilwan Kim, Seoul (KR); Byeongjun Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 176 days.

(21) Appl. No.: 18/208,540

(22) Filed: Jun. 12, 2023

(65) Prior Publication Data

US 2023/0398868 A1 Dec. 14, 2023

(30) Foreign Application Priority Data

Jun. 10, 2022 (KR) .................. 10-2022-0070770
Oct. 19, 2022 (WO) ................ PCT/KR2022/095146

(51) Int. Cl.
  *G01C 21/36* (2006.01)
  *B60K 35/23* (2024.01)
  (Continued)

(52) U.S. Cl.
  CPC ............ *G01C 21/365* (2013.01); *B60K 35/23* (2024.01); *B60K 35/28* (2024.01); *B60K 35/29* (2024.01);
  (Continued)

(58) Field of Classification Search
  CPC .. G01C 21/365; G01C 21/3647; B60K 35/00; B60K 35/23; B60K 35/28; B60K 35/29;
  (Continued)

(56) References Cited

U.S. PATENT DOCUMENTS 6,182,010 B1   1/2001   Berstis
9,403,436 B1   8/2016   Yamada
(Continued)

FOREIGN PATENT DOCUMENTS

JP   2012032811   2/2012
JP   2022058537   4/2022
(Continued)

OTHER PUBLICATIONS

Translation of WO-2020166252-A1, 32 pages (Year: 2020).*
(Continued)

*Primary Examiner* — Dale W Hilgendorf
(74) *Attorney, Agent, or Firm* — LEE, HONG, DEGERMAN, KANG & WAIMEY

(57) ABSTRACT

An Augmented Reality (AR) display device interoperating with a vehicle and a method for operating the same are disclosed. An AR display device according to the present disclosure can provide an intuitive AR route to a parking available area or charging available area in a parking lot or charging station based on Advanced Driver Assistance Systems (ADAS) sensing data of a vehicle and/or control data of a parking lot/charging station. It is recognized that the vehicle has arrived in from of a selected parking space or charger, and an AR graphic interface can be changed in real time to sequentially guide forward driving, a change point to reverse driving, and reverse driving to the vehicle in correspondence to a current driving state of the vehicle, such that the vehicle can be parked accurately in the parking space or in front of the charger.

11 Claims, 22 Drawing Sheets

(51) Int. Cl.
*B60K 35/28* (2024.01)
*B60K 35/29* (2024.01)
*G06V 20/20* (2022.01)
*G06V 20/58* (2022.01)

(52) U.S. Cl.
CPC ......... *G01C 21/3647* (2013.01); *G06V 20/20* (2022.01); *G06V 20/582* (2022.01); *G06V 20/586* (2022.01); *B60K 2360/166* (2024.01); *B60K 2360/176* (2024.01); *B60K 2360/177* (2024.01); *B60K 2360/178* (2024.01); *B60K 2360/1868* (2024.01)

(58) Field of Classification Search
CPC ........ B60K 2360/166; B60K 2360/176; B60K 2360/177; B60K 2360/178; B60K 2360/1868; G06V 20/20; G06V 20/582; G06V 20/586

See application file for complete search history.

(56) References Cited

U.S. PATENT DOCUMENTS

| | | | |
|---|---|---|---|
| 9,586,579 B1* | 3/2017 | Laskowsky | B60K 35/28 |
| 9,852,547 B2 | 12/2017 | Bostick et al. | |
| 2006/0058945 A1* | 3/2006 | Watanabe | G01C 21/3685 701/424 |
| 2009/0030601 A1 | 1/2009 | Sawaki et al. | |
| 2010/0164702 A1* | 7/2010 | Sasaki | G02B 27/01 345/7 |
| 2012/0008048 A1* | 1/2012 | Sekine | G06T 19/006 348/565 |
| 2016/0003636 A1* | 1/2016 | Ng-Thow-Hing | G08G 1/167 701/418 |
| 2016/0129836 A1 | 5/2016 | Sugita et al. | |
| 2016/0349066 A1 | 12/2016 | Chung et al. | |
| 2017/0092130 A1 | 3/2017 | Bostick et al. | |
| 2018/0099661 A1 | 4/2018 | Bae et al. | |
| 2018/0130351 A1* | 5/2018 | Ha | B60R 1/22 |
| 2018/0157036 A1* | 6/2018 | Choi | G09G 3/001 |
| 2019/0180485 A1* | 6/2019 | Kim | G06V 20/20 |
| 2019/0226866 A1* | 7/2019 | Chang | G06V 20/20 |
| 2019/0232952 A1 | 8/2019 | Kim et al. | |
| 2020/0116518 A1* | 4/2020 | Lee | G06F 3/013 |
| 2020/0219325 A1* | 7/2020 | Seo | G08G 1/096741 |
| 2020/0307616 A1* | 10/2020 | Nithiyanantham | G02B 27/0093 |
| 2021/0039715 A1 | 2/2021 | Ferrer et al. | |
| 2021/0078503 A1* | 3/2021 | Horihata | G09G 5/00 |
| 2021/0108926 A1 | 4/2021 | Tran | |
| 2021/0207971 A1* | 7/2021 | Kim | G06V 20/58 |
| 2021/0215499 A1* | 7/2021 | Kassner | G01C 21/3415 |
| 2021/0223058 A1* | 7/2021 | Horihata | G01C 21/3635 |
| 2021/0385611 A1* | 12/2021 | Takahara | H04W 4/025 |
| 2022/0080828 A1* | 3/2022 | Sung | B60K 35/10 |
| 2023/0030600 A1* | 2/2023 | Shi | G08G 1/148 |
| 2023/0037767 A1 | 2/2023 | Yang et al. | |
| 2023/0121388 A1 | 4/2023 | Khan et al. | |
| 2023/0221569 A1 | 7/2023 | Ohyama et al. | |
| 2023/0360331 A1 | 11/2023 | Wan et al. | |
| 2024/0017736 A1* | 1/2024 | Kume | G08G 1/16 |

FOREIGN PATENT DOCUMENTS

| | | | |
|---|---|---|---|
| KR | 1020170101758 | 9/2017 | |
| KR | 1020190078676 | 7/2019 | |
| KR | 102007009 | 10/2019 | |
| KR | 1020190136691 | 12/2019 | |
| KR | 10-2023-0065287 | 5/2023 | |
| WO | WO-2020166252 A1 * | 8/2020 | ............. B60K 35/00 |
| WO | 2022080146 | 4/2022 | |
| WO | WO-2022080146 A1 * | 4/2022 | ............. B60K 35/00 |

OTHER PUBLICATIONS

Translation of WO-2022080146-A1, 36 pages (Year: 2022).*
European Patent Office Application Serial No. 23175929.1, Search Report dated Nov. 7, 2023, 18 pages.
Prasad, "Identifying Lane Changes Automatically using the GPS Sensor for Portable Devices," Delft University of Technology, Nov. 2021, 31 pages.
Gayathiri et al., "Lane Change Detection and Tracking for a Safe-Lane Approach in Real Time Vision Based Navigation Systems," Deparetment of Electrical and Electronics Engineering, Amrita School of Engineering, CS & IT-CSCP, Jan. 2011, 31 pages.
Wikipedia, "Augmented reality," Jun. 2022, 46 pages.
European Patent Office Application Serial No. 23175932.5, Search Report dated Nov. 2, 2023, 11 pages.
European Patent Office Application Serial No. 23175934.1, Search Report dated Nov. 2, 2023, 17 pages.
European Patent Office Application Serial No. 23175933.3, Search Report dated Nov. 2, 2023, 13 pages.
PCT International Application No. PCT/KR2022/095146, International Search Report dated Mar. 9, 2023, 9 pages.
European Patent Office Application Serial No. 23175934.1, Search Report dated Feb. 8, 2024, 14 pages.
United States Patent and Trademark Office U.S. Appl. No. 18/208,537, Office Action dated Mar. 5, 2025, 17 pages.
United States Patent and Trademark Office U.S. Appl. No. 18/208,622, Office Action dated Apr. 21, 2025, 20 pages.

* cited by examiner

AR DISPLAY DEVICE FOR VEHICLE AND METHOD FOR OPERATING SAME

CROSS-REFERENCE TO RELATED APPLICATION

Pursuant to 35 U.S.C. § 119, this application claims the benefit of earlier filing date and right of priority to Korean Application No. 10-2022-0070770, filed on Jun. 10, 2022, and International Application No. PCT/KR2022/095146, filed on Oct. 19, 2022, the contents of which are all incorporated by reference herein in their entirety.

TECHNICAL FIELD

The present disclosure relates to an Augmented Reality (AR) display device interoperating with a vehicle, a method for operating the same, and more specifically, to an AR display device capable of providing guidance associated with parking or charging of the vehicle through an AR technology, and a method for operating the same.

BACKGROUND ART

For safety and convenience of a user who uses a vehicle, various sensors and devices are disposed at the vehicle, and functions of the vehicle are diversified. The functions of the vehicle may be divided into a convenience function for promoting driver's convenience, and a safety function for enhancing safety of the driver and/or pedestrians.

First, the convenience function has a development motive associated with the driver's convenience, such as providing infotainment (information+entertainment) to the vehicle, supporting a partially autonomous driving function, or helping the driver ensuring a field of vision at night or at a blind spot. For example, the convenience functions may include various functions, such as an active cruise control (ACC), a smart parking assist system (SPAS), a night vision (NV) system, a head up display (HUD), an around view monitor (AVM), an adaptive headlight system (AHS), and the like.

The safety function of the vehicle is a technique of ensuring safeties of the driver and/or pedestrians, and may include various functions, such as a lane departure warning system (LDWS), a lane keeping assist system (LKAS), an autonomous emergency braking (AEB), and the like.

Recently, Augmented Reality (AR) that outputs a graphic object through a windshield of a vehicle or a Head Up Display (HUD) or additionally outputs a graphic object to the real world by outputting the graphic object to an image captured by a camera is being actively developed. In particular, the development of technologies for guiding a route (or path) to a driver by utilizing an augmented reality (AR) technology is further increasing.

Meanwhile, in the past, even if such an augmented reality (AR) technology was applied to route guidance according to an AR driving mode, existing driving guidance was simply displayed in an AR form. For example, driving direction change guidance was merely output as an AR image at a fixed position.

Accordingly, it was difficult to distinguish the AR image from other AR features of the AR driving mode, which caused a limit to providing intuitive route guidance. In addition, a driver who was inexperienced in driving was limited to driving a vehicle accurately according to the guidance. This is the same even if a remaining distance value is displayed together with the driving direction change guidance. Therefore, research is needed to perform a more intuitive and complete AR driving mode.

In particular, when parking or charging a vehicle, a driver inexperienced in driving has difficulty in finding a desired location in a complicated space. However, in an existing AR driving mode, even if a parking or charging space is searched in advance, there is a limit to providing more intuitive guidance associated with the searched space. This is similarly caused even in the case of recognizing a space available for parking or charging in advance through communication with a control system.

DISCLOSURE OF INVENTION

Technical Problem

The present disclosure is directed to solving the aforementioned problems and other drawbacks.

According to some embodiments, an aspect of the present disclosure is to provide an AR display device capable of performing a more intuitive and highly complete AR driving mode, and a method for operating the same.

According to some embodiments, another aspect of the present disclosure is to provide an AR display device capable of providing search, path (route), and required information through a more intuitive AR graphic interface when a vehicle enters a parking lot/charging station, and a method for operating the same.

According to some embodiments of the present disclosure, still another aspect of the present disclosure is to provide an AR display device capable of searching in advance for an optimal parking available area and/or charging available area in a parking lot/charging station, and providing a guidance route in a direction convenient for parking by varying an AR graphic interface in real time, and a method for operating the same.

According to some embodiments, still another aspect of the present disclosure is to provide an AR display device capable of providing a User Experience (UX) using an intuitive AR graphic interface to prevent a vehicle from moving in a prohibited direction in a parking lot/charging station, and a method for operating the same.

Solution to Problem

To achieve the above aspects and other advantages and in accordance with the purpose of the present disclosure, as embodied and broadly described herein, there is provided an AR display device of a vehicle that is capable of providing an intuitive AR guidance route to a parking available area or charging available area, when the vehicle enters a parking lot/charging station, based on Advanced Driver Assistance Systems (ADAS) sensing data and/or control data of the parking lot/charging station.

In an AR display device of a vehicle according to the present disclosure, a front area of a selected desired parking space or charger is recognized so as for the vehicle to stop exactly in front of the desired parking space or charger, and an AR graphic interface can be varied in real time to sequentially indicate forward driving, a change point to reverse driving, and reverse driving to the vehicle in correspondence to a current driving state of the vehicle.

Specifically, an AR display device according to the present disclosure may include a, a communication module configured to receive image data including a front image of the vehicle, location data including a current location of the vehicle, map data relating to the current location of the vehicle and sensing data of the vehicle; a processor configured activate a preset application to render an AR graphic interface overlapping the front image, the AR graphic interface including a first AR object indicating a current driving state of the vehicle and a second AR object indicating a guide for driving based on the current location of the vehicle and the map data; and a display configured to display the front image overlapped by the AR graphic interface according to the rendering, wherein the processor is further configured to: in response to the vehicle entering a parking area including a charging area, search for a parking available area based on at least one of the sensing data and control data of the parking area, and separate second AR object from the first AR object and update the AR graphic interface to guide the vehicle to the searched parking through the separated second AR object available area.

According to an embodiment, the processor may render a third AR object to a location of the searched parking available area on the front image of the vehicle, the third AR object displaying the searched parking available area to be selectively by an user input, and update the AR graphic interface, in response to selection of the indicated parking available area through the third AR object, such that the separated second AR object display a guidance toward to the selected parking available area of the front image.

According to an embodiment, the processor may display the separated second AR object to be rotated relative to the first AR object during the search for the parking available area, and update the AR graphic interface to be displayed in a manner that the separated second AR object is joined to the first AR object, in response to an end of the search.

According to an embodiment, the processor may recognize that the vehicle has entered in a prohibited driving direction based on current location and driving state of the vehicle, and update the separated second AR object to output a first guide for displaying a warning notification and a second guide for guiding an allowed driving direction.

According to an embodiment, the processor may update the AR graphic interface to display a location of a parking available area, re-searched based on the sensing data and the control data, in a peripheral area in the allowed driving direction.

According to an embodiment, the processor may determine an available parking type based on a proximity of the vehicle to the selected parking area, and update the AR graphic interface according to the determination such that the second AR object is separated to display a parking guide line for the vehicle to be driven.

According to an embodiment, in response to the determination of the available parking type, calculate a change point to reverse driving predicted based on a current location of the vehicle and a location of the selected parking available area, and display a first guide line toward the change point through the separated second AR object, and update the AR graphic interface to display a second guide line for the vehicle to travel backward into the selected parking area through the separated AR object, in response to the current location of the vehicle corresponding to the first AR object being close to the change point.

According to an embodiment, in response to the vehicle entering the parking area, the processor may determine whether the vehicle needs to be charged based on the sensing data of the vehicle, determination on that the vehicle needs charging, search for a charging available area in the charging area based on at least one of the sensing data and the control data, and update the AR graphic interface to display a location of the searched charging available area.

According to an embodiment, the processor may update the AR graphic interface to display charging-related information regarding the searched charging available area on the front image, and the charging-related information includes at least one of a charging method and a charging rate.

According to an embodiment, the processor may update the AR graphic interface to display information related to a remaining charging time for each adjacent charging available area to a current location of the vehicle, in response to a search failure of the charging available area.

According to an embodiment, the processor may update the AR graphic interface such that the first AR object is rotated to a driving direction of the vehicle, and the separated second AR object displays guide trajectories from the first AR object toward a location of the searched parking available area.

According to an embodiment, the guide trajectories for the searched parking available area may indicate a guidance route generated based on at least one of ADAS sensing data of the vehicle and the control data of the parking area.

Alternatively, the above-identified functions performed by the processor of the AR display device may be performed by one or more processors located outside the AR display device.

Advantageous Effects of Invention

Hereinafter, effects of an AR display device of a vehicle and a method for operating the same according to the present disclosure will be described.

In an AR display device and its operating method according to some embodiments of the present disclosure, a current location of a vehicle and a predicted driving situation can be simultaneously guided on a front image, which is calibrated even without separate setting, using AR objects, thereby providing a more intuitive and realistic AR guidance to the vehicle.

In an AR display device and a method for operating the same according to some embodiments of the present disclosure, when a vehicle enters a parking lot/charging station, a search, route, and necessary information can be provided through a more intuitive AR graphic interface.

In an AR display device of a vehicle according to the present disclosure, an arrival in front of a selected parking space or charger is recognized, and an AR graphic interface is varied in real time to sequentially guide forward driving, a change point to reverse driving, and reverse driving to the vehicle in correspondence to a current driving state of the vehicle, such that the vehicle can be accurately parked in the parking space or in front of the charger.

In addition, when the vehicle enters a parking lot or charging station, a route guidance for a parking/charging available area, parking/charging related information, and a route guidance for an exit can be provided through a more intuitive AR graphic interface through communication with a control server of the parking lot or charging station or through ADAS sensing, thereby providing a direct and smart parking/charging related UX.

MODE FOR THE INVENTION

Figure 1:
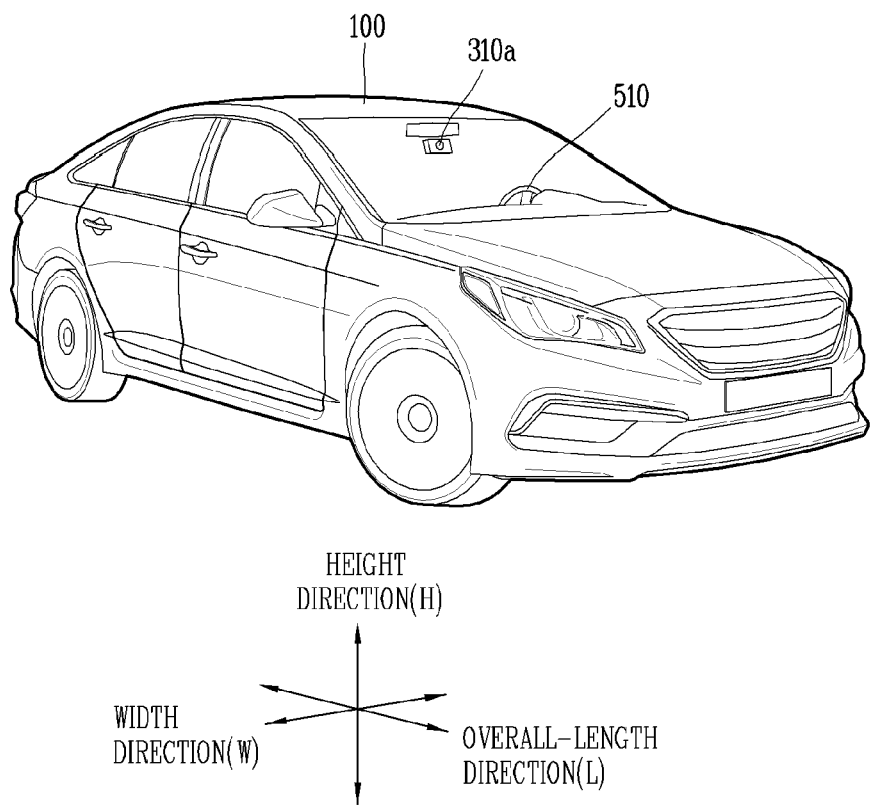
FIG. 1 is a diagram illustrating an example of a vehicle in accordance with an embodiment of the present disclosure.

Hereinafter, embodiments disclosed herein will be described in detail with reference to the accompanying drawings, and the same or similar elements are designated with the same numeral references, regardless of the numerals in the drawings, and their redundant description will be omitted. In general, a suffix such as "module" and "unit" may be used to refer to elements or components. Use of such a suffix herein is merely intended to facilitate description of the specification, and the suffix itself is not intended to give any special meaning or function. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the another element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

A vehicle according to an embodiment of the present disclosure may be understood as a conception including cars, motorcycles and the like. Hereinafter, the vehicle will be described based on a car.

The vehicle according to the embodiment of the present invention may be a conception including all of an internal combustion engine car having an engine as a power source, a hybrid vehicle having an engine and an electric motor as power sources, an electric vehicle having an electric motor as a power source, and the like.

In the following description, a left side of a vehicle refers to a left side in a driving direction of the vehicle, and a right side of the vehicle refers to a right side in the driving direction.

The term "system" disclosed herein may include at least one of a server device and a cloud device, but is not limited thereto. For example, a system may include one or more server devices. As another example, a system may include one or more cloud devices. As still another example, a system may be operated by including a server device and a cloud device together.

The term "map information" or "map data" disclosed herein refers to a meaning including map information, map data, and map-related applications, such as an image captured through a vision sensor such as a camera, 2D map information, 3D map information, digital twin 3D map, high-definition map (HD map), and maps in real/virtual spaces.

The term "Point of Interest (POI) information" disclosed herein is a point of interest selected based on the map information or map data, and may include pre-registered POI information (POI stored in a map of a cloud server), user-set POI information (e.g., home, school, company, etc.), driving-related POI information (e.g., destination, via point, gas station, rest area, parking lot, etc.), and top search POI information (e.g., POI with recent clicks/visits, hot places, etc.). This POI information may be updated in real time based on a current location of the vehicle.

The term "front image" disclosed herein is obtained through a vehicle or a vision sensor around the vehicle, or an AR camera of an AR display device, for example, may include an image acquired or projected through a vision sensor (camera, laser sensor for image, etc.) while driving the vehicle, a real image itself projected on a windshield of the vehicle, or an image of a virtual space. That is, the front image may refer to a meaning including an image output through a display, an image projected through a laser sensor, or a real image itself viewed through the windshield of the vehicle.

Figure 2:
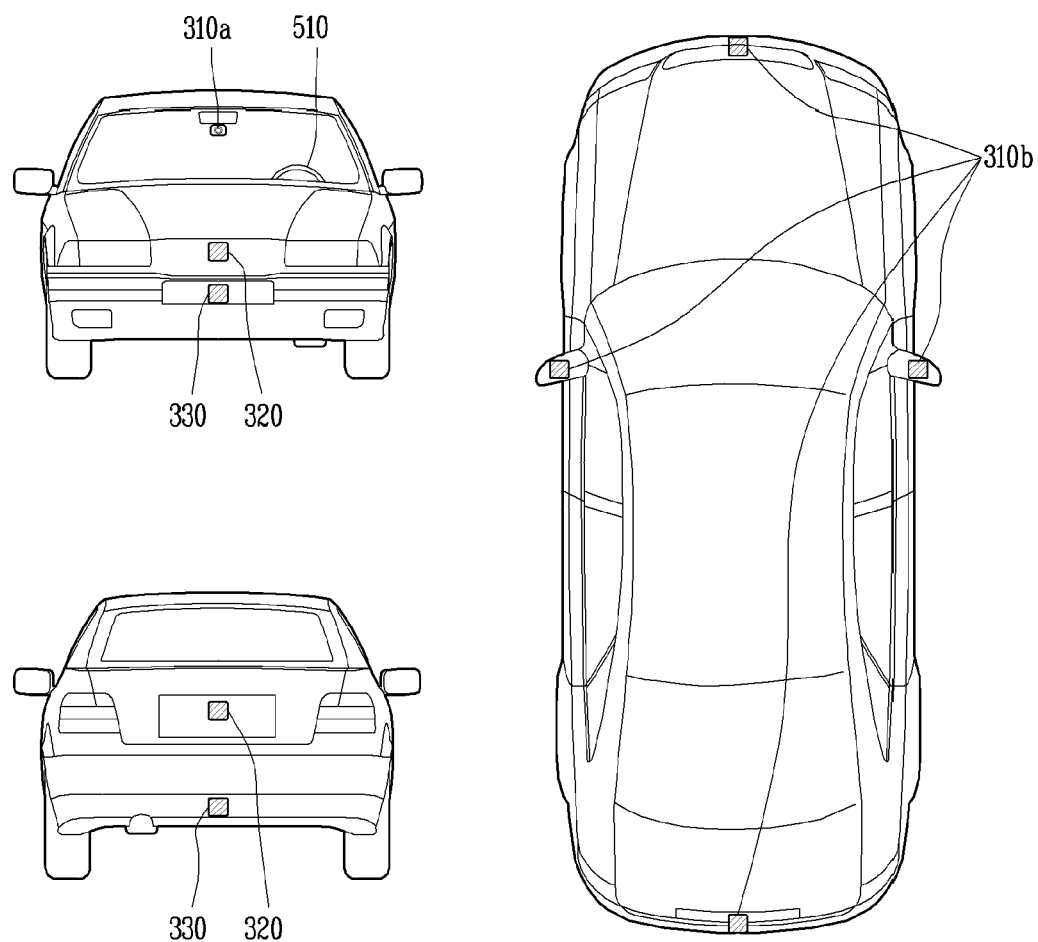
FIG. 2 is a diagram illustrating the vehicle in accordance with the embodiment at various angles.
Figure 3:
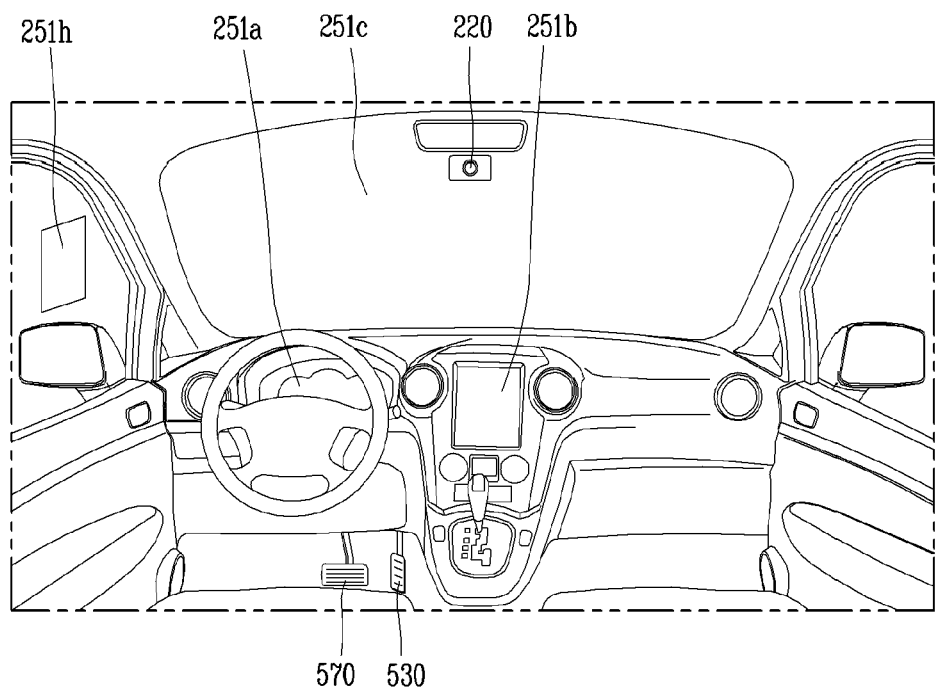
FIGS. 3 and 4 are diagrams illustrating an inside of the vehicle in accordance with the embodiment.
Figure 4:
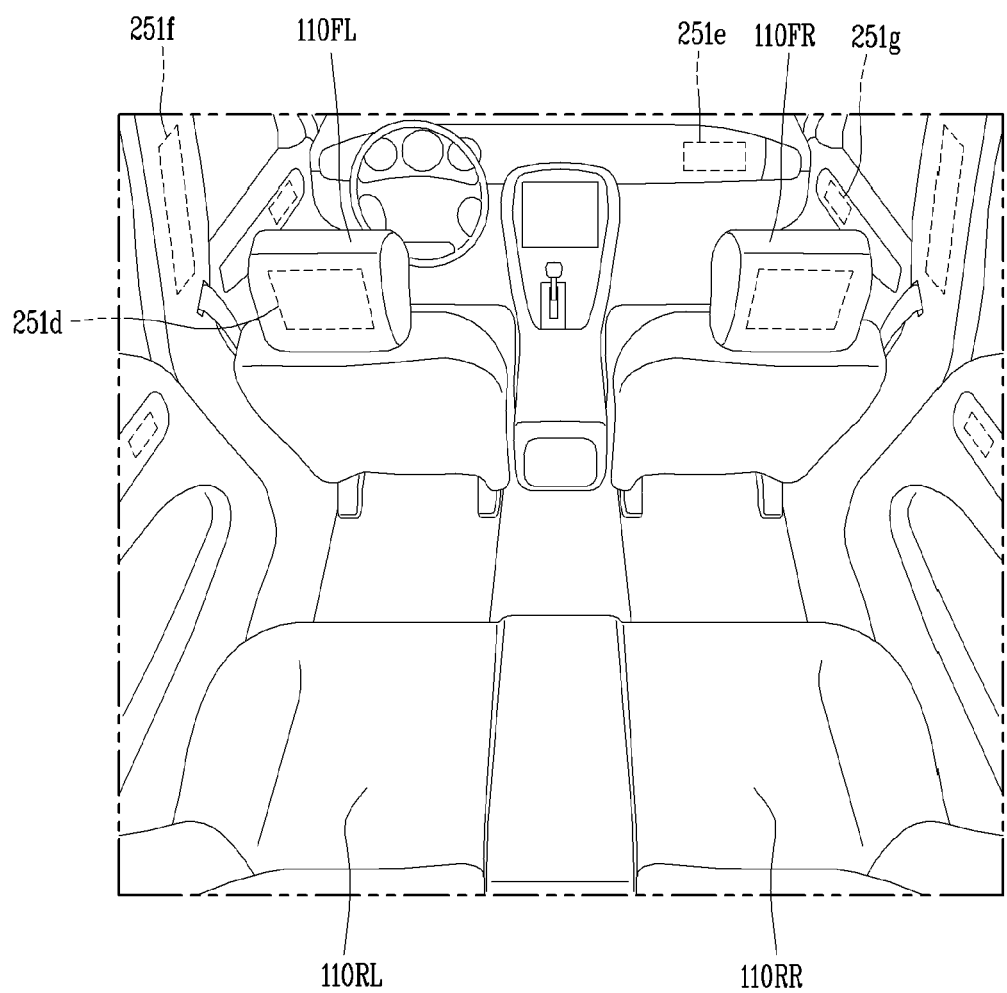

FIGS. 1 and 2 are diagrams illustrating the outside of a vehicle in accordance with the embodiment, and FIGS. 3 and 4 are diagrams illustrating the inside of the vehicle.

Figure 5:
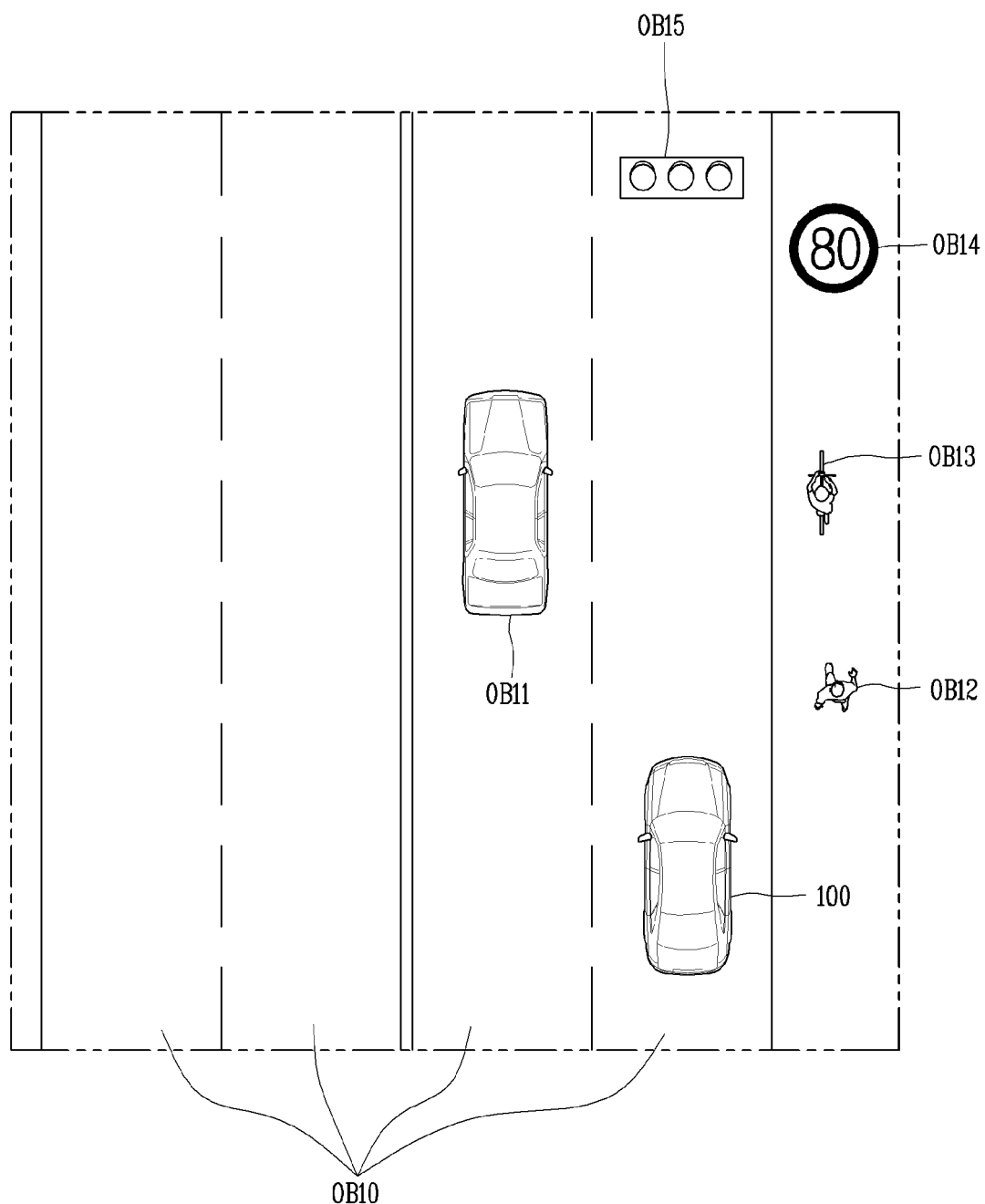
FIGS. 5 and 6 are reference views illustrating various objects in relation to traveling of the vehicle in accordance with the embodiment.
Figure 6:
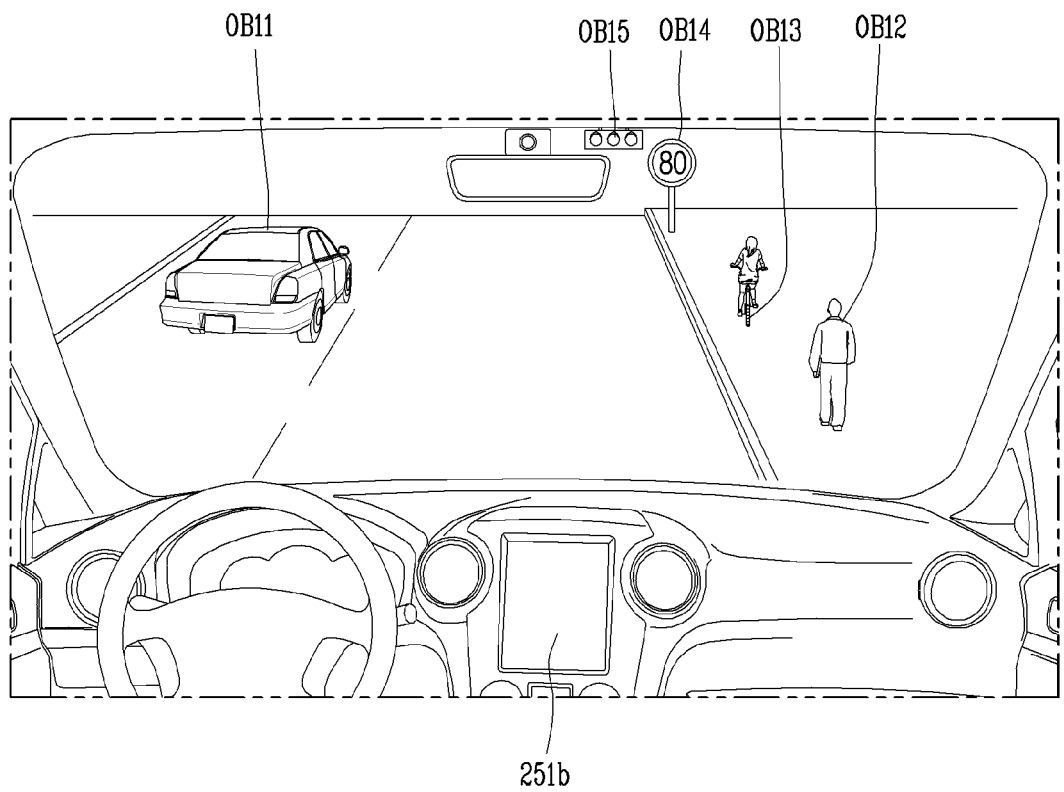

FIGS. 5 and 6 are reference views illustrating various objects in relation to traveling of the vehicle in accordance with the embodiment.

Figure 7:
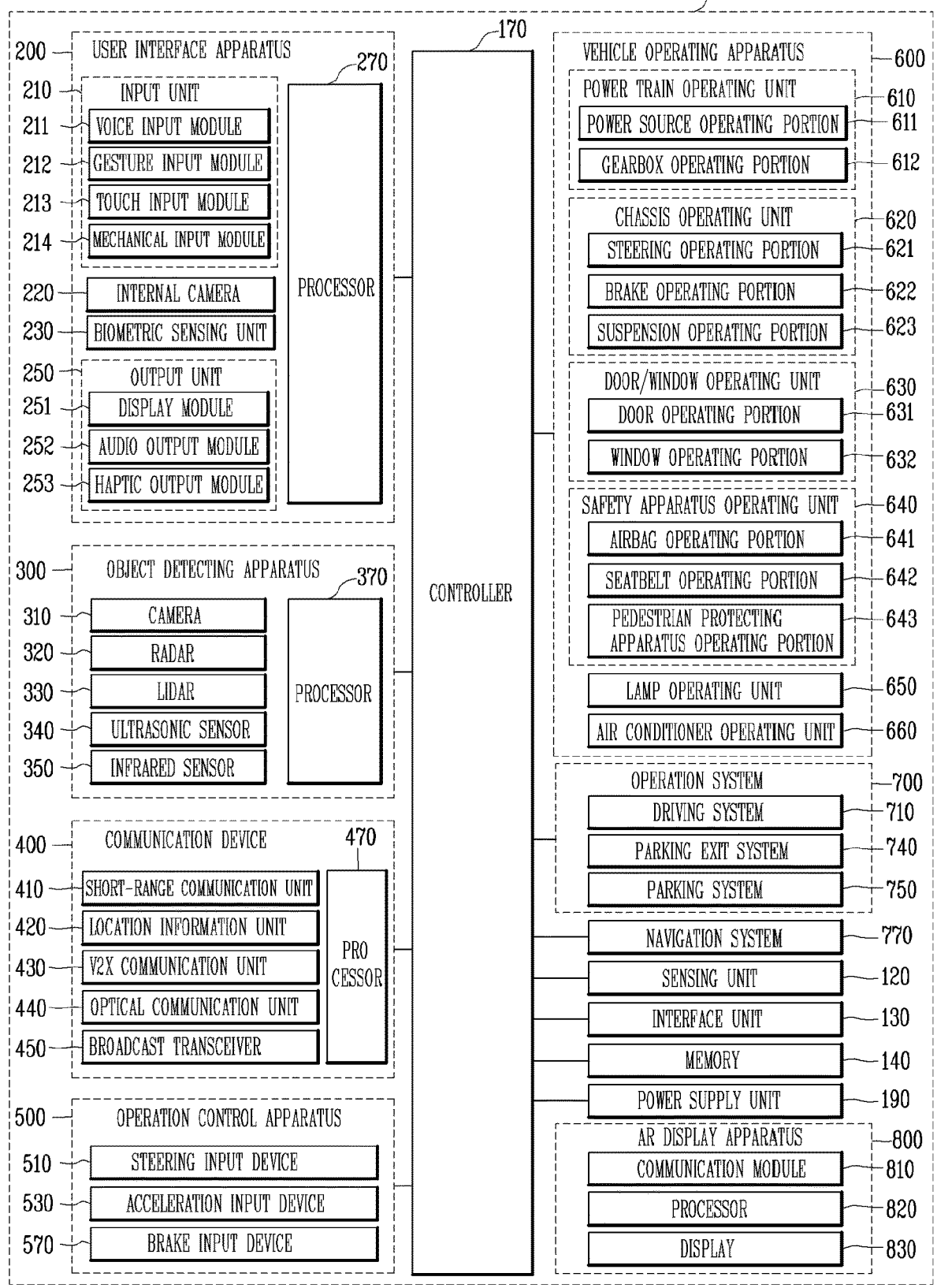
FIG. 7 is a block diagram illustrating a vehicle and an AR display device in accordance with an embodiment.

FIG. 7 is a block diagram illustrating the vehicle in accordance with the embodiment. FIG. 7 is a block diagram referred for explaining the vehicle according to the embodiment.

As illustrated in FIGS. 1 to 7, a vehicle 100 may include wheels turning by a driving force, and a steering apparatus 510 for adjusting a driving (ongoing, moving) direction of the vehicle 100.

The vehicle 100 may be an autonomous vehicle. The vehicle 100 may be switched into an autonomous mode or a manual mode based on a user input. For example, the vehicle 100 may be converted from the manual mode into the autonomous mode or from the autonomous mode into the manual mode based on a user input received through a user interface apparatus 200 (may also be referred to as 'user terminal').

The vehicle 100 may be switched into the autonomous mode or the manual mode based on driving environment information. The driving environment information may be generated based on object information provided from an object detecting apparatus 300. For example, the vehicle 100 may be switched from the manual mode into the autonomous mode or from the autonomous mode into the manual mode based on driving environment information generated in the object detecting apparatus 300. In an example, the vehicle 100 may be switched from the manual mode into the autonomous mode or from the autonomous mode into the manual mode based on driving environment information received through a communication apparatus 400.

The vehicle 100 may be switched from the manual mode into the autonomous mode or from the autonomous mode into the manual mode based on information, data or signal provided from an external device.

When the vehicle 100 is driven in the autonomous mode, the autonomous vehicle 100 may be driven based on an operation system 700. For example, the autonomous vehicle 100 may be driven based on information, data or signals generated in a driving system 710, a parking exit system 740 and a parking system 750.

When the vehicle 100 is driven in the manual mode, the autonomous vehicle 100 may receive a user input for driving through a driving control apparatus 500. The vehicle 100 may be driven based on the user input received through the driving control apparatus 500.

An overall length refers to a length from a front end to a rear end of the vehicle 100, a width refers to a width of the vehicle 100, and a height refers to a length from a bottom of a wheel to a roof. In the following description, an overall-length direction L may refer to a direction which is a criterion for measuring the overall length of the vehicle 100, a width direction W may refer to a direction that is a criterion for measuring a width of the vehicle 100, and a height direction H may refer to a direction that is a criterion for measuring a height of the vehicle 100.

As illustrated in FIG. 7, the vehicle 100 may include a user interface apparatus (may also be referred to as 'user terminal') 200, an object detecting apparatus 300, a communication apparatus 400, a driving control apparatus 500, a vehicle operating apparatus 600, an operation system 700, a navigation system 770, a sensing unit 120, an interface unit 130, a memory 140, a controller 170 and a power supply unit 190.

According to embodiments, the vehicle 100 may include more components in addition to components to be explained in this specification or may not include some of those components to be explained in this specification.

The user interface apparatus 200 is an apparatus for communication between the vehicle 100 and a user. The user interface apparatus 200 may receive a user input and provide information generated in the vehicle 100 to the user. The vehicle 100 may implement user interfaces (UIs) or user experiences (UXs) through the user interface apparatus (may also be referred to as 'user terminal') 200.

The user interface apparatus 200 may include an input unit 210, an internal camera 220, a biometric sensing unit 230, an output unit 250, and a processor 270. According to embodiments, the user interface apparatus 200 may include more components in addition to components to be explained in this specification or may not include some of those components to be explained in this specification.

The input unit 210 may allow the user to input information. Data collected in the input unit 210 may be analyzed by the processor 270 and processed as a user's control command.

The input unit 210 may be disposed inside the vehicle. For example, the input unit 210 may be disposed on one region of a steering wheel, one region of an instrument panel, one region of a seat, one region of each pillar, one region of a door, one region of a center console, one region of a headlining, one region of a sun visor, one region of a windshield, one region of a window, or the like.

The input unit 210 may include a voice input module 211, a gesture input module 212, a touch input module 213, and a mechanical input module 214.

The audio input module 211 may convert a user's voice input into an electric signal. The converted electric signal may be provided to the processor 270 or the controller 170. The audio input module 211 may include at least one microphone.

The gesture input module 212 may convert a user's gesture input into an electric signal. The converted electric signal may be provided to the processor 270 or the controller 170.

The gesture input module 212 may include at least one of an infrared sensor and an image sensor for detecting the user's gesture input. According to embodiments, the gesture input module 212 may detect a user's three-dimensional (3D) gesture input. To this end, the gesture input module 212 may include a light emitting diode outputting a plurality of infrared rays or a plurality of image sensors.

The gesture input module 212 may detect the user's 3D gesture input by a time of flight (TOF) method, a structured light method or a disparity method.

The touch input module 213 may convert the user's touch input into an electric signal. The converted electric signal may be provided to the processor 270 or the controller 170.

The touch input module 213 may include a touch sensor for detecting the user's touch input. According to an embodiment, the touch input module 213 may be integrated with the display module 251 so as to implement a touch screen. The touch screen may provide an input interface and an output interface between the vehicle 100 and the user.

The mechanical input module 214 may include at least one of a button, a dome switch, a jog wheel and a jog switch. An electric signal generated by the mechanical input module 214 may be provided to the processor 270 or the controller 170. The mechanical input module 214 may be arranged on a steering wheel, a center fascia, a center console, a cockpit module, a door and the like.

The internal camera 220 may acquire an internal image of the vehicle. The processor 270 may detect a user's state based on the internal image of the vehicle. The processor 270 may acquire information related to the user's gaze from the internal image of the vehicle. The processor 270 may detect a user gesture from the internal image of the vehicle.

The biometric sensing unit 230 may acquire the user's biometric information. The biometric sensing unit 230 may include a sensor for detecting the user's biometric information and acquire fingerprint information and heart rate information regarding the user using the sensor. The biometric information may be used for user authentication.

The output unit 250 may generate an output related to a visual, audible or tactile signal. The output unit 250 may include at least one of a display module 251, an audio output module 252 and a haptic output module 253.

The display module 251 may output graphic objects corresponding to various types of information. The display module 251 may include at least one of a liquid crystal display (LCD), a thin film transistor-LCD (TFT LCD), an organic light-emitting diode (OLED), a flexible display, a three-dimensional (3D) display and an e-ink display.

The display module 251 may be inter-layered or integrated with a touch input module 213 to implement a touch screen.

The display module 251 may be implemented as a head up display (HUD). When the display module 251 is implemented as the HUD, the display module 251 may be provided with a projecting module so as to output information through an image which is projected on a windshield or a window.

The display module 251 may include a transparent display. The transparent display may be attached to the windshield or the window. The transparent display may have a predetermined degree of transparency and output a predetermined screen thereon. The transparent display may include at least one of a thin film electroluminescent (TFEL), a transparent OLED, a transparent LCD, a transmissive transparent display, and a transparent LED display. The transparent display may have adjustable transparency.

Meanwhile, the user interface apparatus 200 may include a plurality of display modules 251a to 251h.

The display module 251 may be disposed on one area of a steering wheel, one area 521a, 251b, 251e of an instrument panel, one area 251d of a seat, one area 251f of each pillar, one area 251g of a door, one area of a center console, one area of a headlining or one area of a sun visor, or implemented on one area 251c of a windshield or one area 251h of a window.

The audio output module 252 may convert an electric signal provided from the processor 270 or the controller 170 into an audio signal for output. To this end, the audio output module 252 may include at least one speaker.

The haptic output module 253 generates a tactile output. For example, the haptic output module 253 may vibrate the steering wheel, a safety belt, a seat 110FL, 110FR, 110RL, 110RR such that the user may recognize such output.

The processor (hereinafter, referred to as 'controller') 270 may control an overall operation of each unit of the user interface apparatus 200. According to an embodiment, the user interface apparatus 200 may include a plurality of processors 270 or may not include any processor 270.

When the processor 270 is not included in the user interface apparatus 200, the user interface apparatus 200 may operate according to a control of a processor of another apparatus within the vehicle 100 or the controller 170.

Meanwhile, the user interface apparatus 200 may be called as a display apparatus for vehicle. The user interface apparatus 200 may operate according to the control of the controller 170.

The object detecting apparatus 300 is an apparatus for detecting an object located at outside of the vehicle 100. The object may be a variety of objects associated with driving (operation) of the vehicle 100. Referring to FIGS. 5 and 6, an object may include a traffic lane OB10, another vehicle OB11, a pedestrian OB12, a two-wheeled vehicle OB13, traffic signals OB14 and OB15, light, a road, a structure, a speed hump, a terrain, an animal and the like.

The lane OB10 may be a driving lane, a lane next to the driving lane or a lane on which another vehicle comes in an opposite direction to the vehicle 100. The lanes OB10 may be a concept including left and right lines forming a lane.

The another vehicle OB11 may be a vehicle which is moving around the vehicle 100. The another vehicle OB11 may be a vehicle located within a predetermined distance from the vehicle 100. For example, the another vehicle OB11 may be a vehicle which moves before or after the vehicle 100.

The pedestrian OB12 may be a person located near the vehicle 100. The pedestrian OB12 may be a person located within a predetermined distance from the vehicle 100. For example, the pedestrian OB12 may be a person located on a sidewalk or roadway.

The two-wheeled vehicle OB12 may refer to a vehicle (transportation facility) that is located near the vehicle 100 and moves using two wheels. The two-wheeled vehicle OB12 may be a vehicle that is located within a predetermined distance from the vehicle 100 and has two wheels. For example, the two-wheeled vehicle OB13 may be a motorcycle or a bicycle that is located on a sidewalk or roadway.

The traffic signals may include a traffic light OB15, a traffic sign OB14 and a pattern or text drawn on a road surface.

The light may be light emitted from a lamp provided on another vehicle. The light may be light generated from a streetlamp. The light may be solar light.

The road may include a road surface, a curve, an upward slope, a downward slope and the like.

The structure may be an object that is located near a road and fixed on the ground. For example, the structure may include a streetlamp, a roadside tree, a building, an electric pole, a traffic light, a bridge and the like.

The terrain may include a mountain, a hill, and the like.

Meanwhile, objects may be classified into a moving object and a fixed object. For example, the moving object may be a concept including another vehicle and a pedestrian. The fixed object may be a concept including a traffic signal, a road and a structure, for example.

The object detecting apparatus 300 may include a camera 310, a radar 320, a LIDAR 330, an ultrasonic sensor 340, an infrared sensor 350 and at least one processor, such as the processor 370.

According to an embodiment, the object detecting apparatus 300 may further include other components in addition to the components described, or may not include some of the components described.

The camera 310 may be located on an appropriate portion outside the vehicle to acquire an external image of the vehicle. The camera 310 may be a mono camera, a stereo camera 310a, an around view monitoring (AVM) camera 310b or a 360-degree camera.

For example, the camera 310 may be disposed adjacent to a front windshield within the vehicle to acquire a front image of the vehicle. Or, the camera 310 may be disposed adjacent to a front bumper or a radiator grill.

For example, the camera 310 may be disposed adjacent to a rear glass within the vehicle to acquire a rear image of the vehicle. Or, the camera 310 may be disposed adjacent to a rear bumper, a trunk or a tail gate.

For example, the camera 310 may be disposed adjacent to at least one of side windows within the vehicle to acquire a side image of the vehicle. Or, the camera 310 may be disposed adjacent to a side mirror, a fender or a door.

The camera 310 may provide an acquired image to the processor 370.

The radar 320 may include electric wave transmitting and receiving portions. The radar 320 may be implemented as a pulse radar or a continuous wave radar according to a principle of emitting electric waves. The radar 320 may be implemented in a frequency modulated continuous wave (FMCW) manner or a frequency shift Keyong (FSK) manner according to a signal waveform, among the continuous wave radar methods.

The radar 320 may detect an object in a time of flight (TOF) manner or a phase-shift manner through the medium of the electric wave, and detect a position of the detected object, a distance from the detected object and a relative speed with the detected object.

The radar 320 may be disposed on an appropriate position outside the vehicle for detecting an object which is located at a front, rear or side of the vehicle.

The LiDAR 330 may include laser transmitting and receiving portions. The LIDAR 330 may be implemented in a time of flight (TOF) manner or a phase-shift manner.

The LiDAR 330 may be implemented as a drive type or a non-drive type.

For the drive type, the LiDAR 330 may be rotated by a motor and detect object near the vehicle 100.

For the non-drive type, the LiDAR 330 may detect, through light steering, objects which are located within a predetermined range based on the vehicle 100. The vehicle 100 may include a plurality of non-drive type LiDARs 330.

The LiDAR 330 may detect an object in a Time of Pulse (TOP) manner or a phase-shift manner through the medium of a laser beam, and detect a position of the detected object, a distance from the detected object and a relative speed with the detected object.

The LiDAR 330 may be disposed on an appropriate position outside the vehicle for detecting an object located at the front, rear or side of the vehicle.

The ultrasonic sensor 340 may include ultrasonic wave transmitting and receiving portions. The ultrasonic sensor 340 may detect an object based on an ultrasonic wave, and detect a position of the detected object, a distance from the detected object and a relative speed with the detected object.

The ultrasonic sensor 340 may be disposed on an appropriate position outside the vehicle for detecting an object located at the front, rear or side of the vehicle.

The infrared sensor 350 may include infrared light transmitting and receiving portions. The infrared sensor 350 may detect an object based on infrared light, and detect a position of the detected object, a distance from the detected object and a relative speed with the detected object.

The infrared sensor 350 may be disposed on an appropriate position outside the vehicle for detecting an object located at the front, rear or side of the vehicle.

The processor 370 may control an overall operation of each unit of the object detecting apparatus 300.

The processor 370 may detect an object based on an acquired image, and track the object. The processor 370 may execute operations, such as a calculation of a distance from the object, a calculation of a relative speed with the object and the like, through an image processing algorithm.

The processor 370 may detect an object based on a reflected electromagnetic wave which an emitted electromagnetic wave is reflected from the object, and track the object. The processor 370 may execute operations, such as a calculation of a distance from the object, a calculation of a relative speed with the object and the like, based on the electromagnetic wave.

The processor 370 may detect an object based on a reflected laser beam which an emitted laser beam is reflected from the object, and track the object. The processor 370 may execute operations, such as a calculation of a distance from the object, a calculation of a relative speed with the object and the like, based on the laser beam.

The processor 370 may detect an object based on a reflected ultrasonic wave which an emitted ultrasonic wave is reflected from the object, and track the object. The processor 370 may execute operations, such as a calculation of a distance from the object, a calculation of a relative speed with the object and the like, based on the ultrasonic wave.

The processor 370 may detect an object based on reflected infrared light which emitted infrared light is reflected from the object, and track the object. The processor 370 may execute operations, such as a calculation of a distance from the object, a calculation of a relative speed with the object and the like, based on the infrared light.

According to an embodiment, the object detecting apparatus 300 may include a plurality of processors 370 or may not include any processor 370. For example, each of the camera 310, the radar 320, the LiDAR 330, the ultrasonic sensor 340 and the infrared sensor 350 may include the processor in an individual manner.

When the processor 370 is not included in the object detecting apparatus 300, the object detecting apparatus 300 may operate according to the control of a processor of an apparatus within the vehicle 100 or the controller 170.

The object detecting apparatus 400 may operate according to the control of the controller 170.

The communication apparatus 400 is an apparatus for performing communication with an external device. Here, the external device may be another vehicle, a mobile terminal or a server.

The communication apparatus 400 may perform the communication by including at least one of a transmitting antenna, a receiving antenna, and radio frequency (RF) circuit and RF device for implementing various communication protocols.

The communication apparatus 400 may include a short-range communication unit 410, a location information unit 420, a V2X communication unit 430, an optical communication unit 440, a broadcast transceiver 450 and a processor 470.

According to an embodiment, the communication apparatus 400 may further include other components in addition to the components described, or may not include some of the components described.

The short-range communication unit 410 is a unit for facilitating short-range communications. Suitable technologies for implementing such short-range communications may include Bluetooth™, Radio Frequency IDentification (RFID), Infrared Data Association (IrDA), Ultra-WideBand (UWB), ZIGBEE™, Near Field Communication (NFC), Wireless-Fidelity (Wi-Fi), Wi-Fi Direct, Wireless USB (Wireless Universal Serial Bus), and the like.

The short-range communication unit 410 may construct short-range area networks to perform short-range communication between the vehicle 100 and at least one external device.

The location information unit 420 is a unit for acquiring position information. For example, the location information unit 420 may include a Global Positioning System (GPS) module or a Differential Global Positioning System (DGPS) module.

The V2X communication unit 430 is a unit for performing wireless communications with a server (Vehicle to Infra; V2I), another vehicle (Vehicle to Vehicle; V2V), or a pedestrian (Vehicle to Pedestrian; V2P). The V2X communication unit 430 may include an RF circuit implementing a communication protocol with the infra (V2I), a communication protocol between the vehicles (V2V) and a communication protocol with a pedestrian (V2P).

The optical communication unit 440 is a unit for performing communication with an external device through the medium of light. The optical communication unit 440 may include a light-emitting diode for converting an electric signal into an optical signal and sending the optical signal to the exterior, and a photodiode for converting the received optical signal into an electric signal.

According to an embodiment, the light-emitting diode may be integrated with lamps provided on the vehicle 100.

The broadcast transceiver 450 is a unit for receiving a broadcast signal from an external broadcast managing entity or transmitting a broadcast signal to the broadcast managing entity via a broadcast channel. The broadcast channel may include a satellite channel, a terrestrial channel, or both. The broadcast signal may include a TV broadcast signal, a radio broadcast signal, and a data broadcast signal.

The processor 470 may control an overall operation of each unit of the communication apparatus 400.

According to an embodiment, the communication apparatus 400 may include a plurality of processors 470 or may not include any processor 470.

When the processor 470 is not included in the communication apparatus 400, the communication apparatus 400 may operate according to the control of a processor of another device within the vehicle 100 or the controller 170.

Meanwhile, the communication apparatus 400 may implement a display apparatus for a vehicle together with the user interface apparatus 200. In this instance, the display device for the vehicle may be referred to as a telematics apparatus or an Audio Video Navigation (AVN) apparatus.

The communication apparatus 400 may operate according to the control of the controller 170.

The driving control apparatus 500 is an apparatus for receiving a user input for driving.

In a manual mode, the vehicle 100 may be operated based on a signal provided by the driving control apparatus 500.

The driving control apparatus 500 may include a steering input device 510, an acceleration input device 530 and a brake input device 570.

The steering input device 510 may receive an input regarding a driving (ongoing) direction of the vehicle 100 from the user. The steering input device 510 is preferably configured in the form of a wheel allowing a steering input in a rotating manner. According to some embodiments, the steering input device may also be configured in a shape of a touch screen, a touch pad or a button.

The acceleration input device 530 may receive an input for accelerating the vehicle 100 from the user. The brake input device 570 may receive an input for braking the vehicle 100 from the user. Each of the acceleration input device 530 and the brake input device 570 is preferably configured in the form of a pedal. According to some embodiments, the acceleration input device or the brake input device may also be configured in a shape of a touch screen, a touch pad or a button.

The driving control apparatus 500 may operate according to the control of the controller 170.

The vehicle operating apparatus 600 is an apparatus for electrically controlling operations of various devices within the vehicle 100.

The vehicle operating apparatus 600 may include a power train operating unit 610, a chassis operating unit 620, a door/window operating unit 630, a safety apparatus operating unit 640, a lamp operating unit 650, and an air-conditioner operating unit 660.

According to an embodiment, the communication apparatus 600 may further include other components in addition to the components described, or may not include some of the components described.

In some examples, the vehicle operating apparatus 600 may include a processor. Each unit of the vehicle operating apparatus 600 may individually include a processor.

The power train operating unit 610 may control an operation of a power train device.

The power train operating unit 610 may include a power source operating portion 611 and a gearbox operating portion 612.

The power source operating portion 611 may perform a control for a power source of the vehicle 100.

For example, upon using a fossil fuel-based engine as the power source, the power source operating portion 611 may perform an electronic control for the engine. Accordingly, an output torque and the like of the engine can be controlled.

The power source operating portion 611 may adjust the engine output torque according to the control of the controller 170.

For example, upon using an electric energy-based motor as the power source, the power source operating portion 611 may perform a control for the motor. The power source operating portion 611 may adjust a rotating speed, a torque and the like of the motor according to the control of the controller 170.

The gearbox operating portion 612 may perform a control for a gearbox. The gearbox operating portion 612 may adjust a state of the gearbox. The gearbox operating portion 612 may change the state of the gearbox into drive (forward) (D), reverse (R), neutral (N) or parking (P).

Meanwhile, when an engine is the power source, the gearbox operating portion 612 may adjust a locked state of a gear in the drive (D) state.

The chassis operating unit 620 may control an operation of a chassis device. The chassis operating unit 620 may include a steering operating portion 621, a brake operating portion 622 and a suspension operating portion 623.

The steering operating portion 621 may perform an electronic control for a steering apparatus within the vehicle 100. The steering operating portion 621 may change a driving direction of the vehicle.

The brake operating portion 622 may perform an electronic control for a brake apparatus within the vehicle 100. For example, the brake operating portion 622 may control an operation of brakes provided at wheels to reduce speed of the vehicle 100.

Meanwhile, the brake operating portion 622 may individually control each of a plurality of brakes. The brake operating portion 622 may differently control braking force applied to each of a plurality of wheels.

The suspension operating portion 623 may perform an electronic control for a suspension apparatus within the vehicle 100. For example, the suspension operating portion 623 may control the suspension apparatus to reduce vibration of the vehicle 100 when a bump is present on a road. Meanwhile, the suspension operating portion 623 may individually control each of a plurality of suspensions.

The door/window operating unit 630 may perform an electronic control for a door apparatus or a window apparatus within the vehicle 100.

The door/window operating unit 630 may include a door operating portion 631 and a window operating portion 632.

The door operating portion 631 may perform the control for the door apparatus. The door operating portion 631 may control opening or closing of a plurality of doors of the vehicle 100. The door operating portion 631 may control opening or closing of a trunk or a tail gate. The door operating portion 631 may control opening or closing of a sunroof.

The window operating portion 632 may perform the electronic control for the window apparatus. The window operating portion 632 may control opening or closing of a plurality of windows of the vehicle 100.

The safety apparatus operating unit 640 may perform an electronic control for various safety apparatuses within the vehicle 100.

The safety apparatus operating unit 640 may include an airbag operating portion 641, a seatbelt operating portion 642 and a pedestrian protecting apparatus operating portion 643.

The airbag operating portion 641 may perform an electronic control for an airbag apparatus within the vehicle 100. For example, the airbag operating portion 641 may control the airbag to be deployed upon a detection of a risk.

The seatbelt operating portion 642 may perform an electronic control for a seatbelt apparatus within the vehicle 100. For example, the seatbelt operating portion 642 may control passengers to be motionlessly seated in seats 110FL, 110FR, 110RL, 110RR using seatbelts upon a detection of a risk.

The pedestrian protection apparatus operating portion 643 may perform an electronic control for a hood lift and a pedestrian airbag. For example, the pedestrian protection apparatus operating portion 643 may control the hood lift and the pedestrian airbag to be open up upon detecting pedestrian collision.

The lamp operating unit 650 may perform an electronic control for various lamp apparatuses within the vehicle 100.

The air-conditioner operating unit 660 may perform an electronic control for an air conditioner within the vehicle 100. For example, the air-conditioner operating unit 660 may control the air conditioner to supply cold air into the vehicle when internal temperature of the vehicle is high.

The vehicle operating apparatus 600 may include a processor. Each unit of the vehicle operating apparatus 600 may individually include a processor.

The vehicle operating apparatus 600 may operate according to the control of the controller 170.

The operation system 700 is a system that controls various driving modes of the vehicle 100. The operation system 700 may operate in an autonomous driving mode.

The operation system 700 may include a driving system 710, a parking exit system 740 and a parking system 750.

According to an embodiment, the operation system 700 may further include other components in addition to the components described, or may not include some of the components described.

Meanwhile, the operation system 700 may include a processor. Each unit of the operation system 700 may individually include at least one processor.

According to embodiments, the operation system may be a sub concept of the controller 170 when it is implemented in a software configuration.

Meanwhile, according to embodiment, the operation system 700 may be a concept including at least one of the user interface apparatus 200, the object detecting apparatus 300, the communication apparatus 400, the vehicle operating apparatus 600 and the controller 170.

The driving system 710 may perform driving of the vehicle 100.

The driving system 710 may receive navigation information from a navigation system 770, transmit a control signal to the vehicle operating apparatus 600, and perform driving of the vehicle 100. The driving system 710 may receive object information from the object detecting apparatus 300, transmit a control signal to the vehicle operating apparatus 600 and perform driving of the vehicle 100. The driving system 710 may receive a signal from an external device through the communication apparatus 400, transmit a control signal to the vehicle operating apparatus 600, and perform driving of the vehicle 100.

The parking exit system 740 may perform an exit of the vehicle 100 from a parking lot.

The parking exit system 740 may receive navigation information from the navigation system 770, transmit a control signal to the vehicle operating apparatus 600, and perform the exit of the vehicle 100 from the parking lot. The parking exit system 740 may receive object information from the object detecting apparatus 300, transmit a control signal to the vehicle operating apparatus 600 and perform the exit of the vehicle 100 from the parking lot. The parking exit system 740 may receive a signal from an external device through the communication apparatus 400, transmit a control signal to the vehicle operating apparatus 600, and perform the exit of the vehicle 100 from the parking lot.

The parking system 750 may perform parking of the vehicle 100.

The parking system 750 may receive navigation information from the navigation system 770, transmit a control signal to the vehicle operating apparatus 600, and park the vehicle 100. The parking system 750 may receive object information from the object detecting apparatus 300, transmit a control signal to the vehicle operating apparatus 600 and park the vehicle 100. The parking system 750 may receive a signal from an external device through the communication apparatus 400, transmit a control signal to the vehicle operating apparatus 600, and park the vehicle 100.

The navigation system 770 may provide navigation information. The navigation information may include at least one of map information, information regarding a set destination, path information according to the set destination, information regarding various objects on a path, lane information and current location information of the vehicle.

The navigation system 770 may include a memory and a processor. The memory may store the navigation information. The processor may control an operation of the navigation system 770.

According to embodiments, the navigation system 770 may update prestored information by receiving information from an external device through the communication apparatus 400.

According to embodiments, the navigation system 770 may be classified as a sub component of the user interface apparatus 200.

The sensing unit 120 may sense a status of the vehicle. The sensing unit 120 may include a posture sensor (e.g., a yaw sensor, a roll sensor, a pitch sensor, etc.), a collision sensor, a wheel sensor, a speed sensor, a tilt sensor, a weight-detecting sensor, a heading sensor, a gyro sensor, a position module, a vehicle forward/backward movement sensor, a battery sensor, a fuel sensor, a tire sensor, a steering sensor by a turn of a handle, a vehicle internal temperature sensor, a vehicle internal humidity sensor, an ultrasonic sensor, an illumination sensor, an accelerator position sensor, a brake pedal position sensor, and the like.

The sensing unit 120 may acquire sensing signals with respect to vehicle-related information, such as a pose, a collision, an orientation, a position (GPS information), an angle, a speed, an acceleration, a tilt, a forward/backward movement, a battery, a fuel, tires, lamps, internal temperature, internal humidity, a rotated angle of a steering wheel, external illumination, pressure applied to an accelerator, pressure applied to a brake pedal and the like.

The sensing unit 120 may further include an accelerator sensor, a pressure sensor, an engine speed sensor, an air flow sensor (AFS), an air temperature sensor (ATS), a water temperature sensor (WTS), a throttle position sensor (TPS), a TDC sensor, a crank angle sensor (CAS), and the like.

The interface unit 130 may serve as a path allowing the vehicle 100 to interface with various types of external devices connected thereto. For example, the interface unit 130 may be provided with a port connectable with a mobile terminal, and connected to the mobile terminal through the port. In this instance, the interface unit 130 may exchange data with the mobile terminal.

In some examples, the interface unit 130 may serve as a path for supplying electric energy to the connected mobile terminal. When the mobile terminal is electrically connected to the interface unit 130, the interface unit 130 supplies electric energy supplied from a power supply unit 190 to the mobile terminal according to the control of the controller 170.

The memory 140 is electrically connected to the controller 170. The memory 140 may store basic data for units, control data for controlling operations of units and input/output data. The memory 140 may be a variety of storage devices, such as ROM, RAM, EPROM, a flash drive, a hard drive and the like in a hardware configuration. The memory 140 may store various data for overall operations of the vehicle 100, such as programs for processing or controlling the controller 170.

According to embodiments, the memory 140 may be integrated with the controller 170 or implemented as a sub component of the controller 170.

The controller 170 may control an overall operation of each unit of the vehicle 100. The controller 170 may be referred to as an Electronic Control Unit (ECU).

The power supply unit 190 may supply power required for an operation of each component according to the control of the controller 170. Specifically, the power supply unit 190 may receive power supplied from an internal battery of the vehicle, and the like.

At least one processor and the controller 170 included in the vehicle 100 may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro controllers, microprocessors, and electric units performing other functions.

Meanwhile, an AR display device 800 according to the present disclosure may display an AR graphic interface indicating a driving state of a vehicle 100 on a front image of the vehicle 100 (or a windshield of the vehicle) in real time through AR merging, on the basis of navigation information of the vehicle 100 and data received from an AR camera.

To this end, the AR display device 800 includes a communication module 810 for communicating with other devices/systems, servers, and vehicles, a processor 820 for controlling overall operations of the AR display device 800, and a display 830 for displaying a navigation screen including a front image upon which an AR graphic interface is rendered.

The communication module 810 may receive image data including a front image of the vehicle, location data including a current location of the vehicle, and map data of the vehicle including a map relating to the current location of the vehicle.

The term 'front image' or 'driving image' disclosed herein refers to an image captured through a camera sensor (or including smart glass having such a function) in a direction in which the vehicle is moving. This term may also refer to an image reflected on an LCD screen through the camera sensor, a real space image shown on a windshield/dashboard and/or a digital twin 3D image.

The term 'navigation screen including the front image (or driving image)' disclosed herein may mean that a front image implemented in the form of one of a front image captured through a camera of a vehicle, an image reflected on an LCD screen, a real space image shown on a windshield, etc., and/or a digital twin 3D image is layered on a navigation screen generated based on a current location and navigation information.

As disclosed herein, the term "parking area" is used to include both a charging station including chargers and a parking lot including parking spaces.

The navigation screen may be an AR navigation screen to which an AR technology is applied.

In addition, the term 'AR graphic interface' disclosed herein is a graphic user interface to which an augmented reality (AR) technology is applied, and AR merging of the AR graphic interface is performed on a front image of a vehicle in real time.

The AR graphic interface in this disclosure may be an AR graphic image representing a current driving state of the vehicle. In addition, the AR graphic interface disclosed herein may be an AR graphic image that further indicates a guide for a driving situation of the vehicle simultaneously with the current driving state of the vehicle. At this time, the guide for the driving situation of the vehicle is displayed on the front image of the vehicle at a predetermined distance and/or a predetermined time ahead of the corresponding driving situation. In addition, the AR graphic interface disclosed herein may be an AR graphic image that moves according to a current driving state of the vehicle and/or a driving situation of the vehicle.

Referring to FIG. 7, the AR display device 800 according to the embodiment of the present disclosure may be implemented as a part of an electrical component or system of the vehicle 100, or may be implemented as a separate independent device or system. Alternatively, the AR display device 800 may be implemented in the form of a program consisting of instructions operated by a processor such as a user terminal of the vehicle 100.

The AR display device 800 may communicate with the vehicle 100, other devices, and/or servers to receive a front image of the vehicle acquired through an AR camera and sensing data acquired through sensors (e.g., a gyroscopic sensor, an acceleration sensor, a gravity sensor, a geomagnetic sensor, a temperature sensor, etc.) provided in the vehicle.

The AR display device 800 may operate a preset application, for example, an (AR) navigation application.

The AR display device 800 may render an AR graphic interface, which represents the current driving state of the vehicle based on map data (e.g., a map relating to a current location of the vehicle, route information, POI information, etc.) of the vehicle, sensing data, and a front image obtained by a camera, and provide the rendered AR graphic interface to an AR GUI surface and an AR camera surface of the navigation application in real time.

The AR display device 800 may render an AR object separated from the AR graphic interface to provide (indicate, display) a guide for a driving situation of the vehicle, based on the map data (e.g., the route information, the POI information, etc.), the sensing data, and the front image obtained by the camera, and provide the rendered AR object to the AR GUI surface and the AR camera surface of the navigation application in real time.

In this case, the separated AR object may be named 'second AR object', and the remaining part of the AR graphic interface after the second AR object is separated may be named 'first AR object'. That is, it can be said that the AR graphic interface includes the first AR object representing the current driving state of the vehicle and the second AR object displaying the guide for the driving situation of the vehicle.

Figure 8:
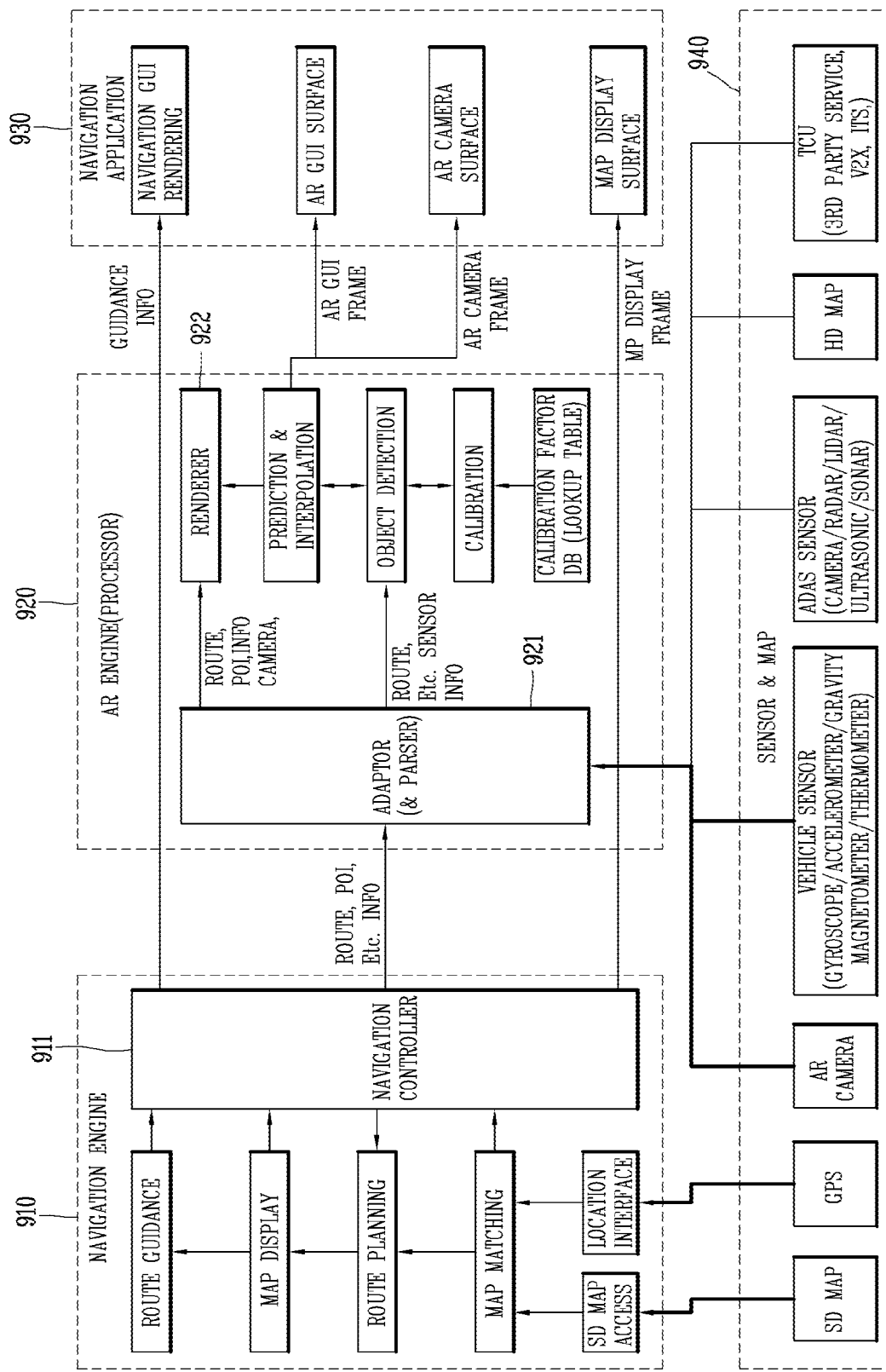
FIG. 8 is a detailed block diagram related to a processor of the AR display device in accordance with the embodiment.

Hereinafter, FIG. 8 is a detailed block diagram related to a processor 820 of the AR display device 800 in accordance with the embodiment.

The conceptual diagram illustrated in FIG. 8 may include a configuration related to operations performed by the processor 820 of the AR display device 800 and information, data, and programs used for the operations. In this aspect, the block diagram illustrated in FIG. 8 may also be used to mean a service provided through the processor 820 and/or a system executed/implemented by the processor 820. Hereinafter, for convenience of explanation, it will be referred to as the processor 820.

Figure 9:
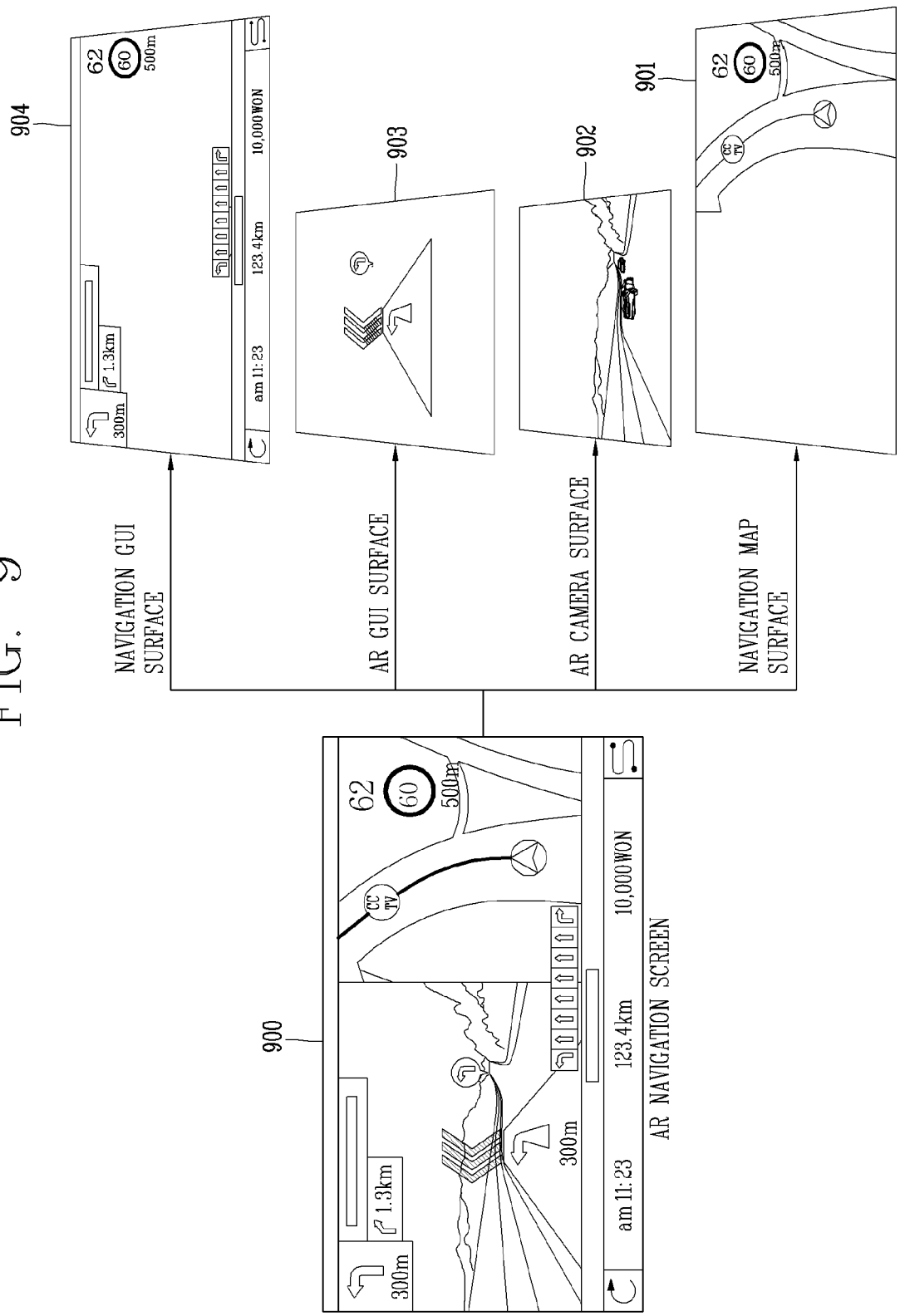
FIG. 9 is a diagram referenced to describe a navigation screen in accordance with an embodiment.
Figure 10:
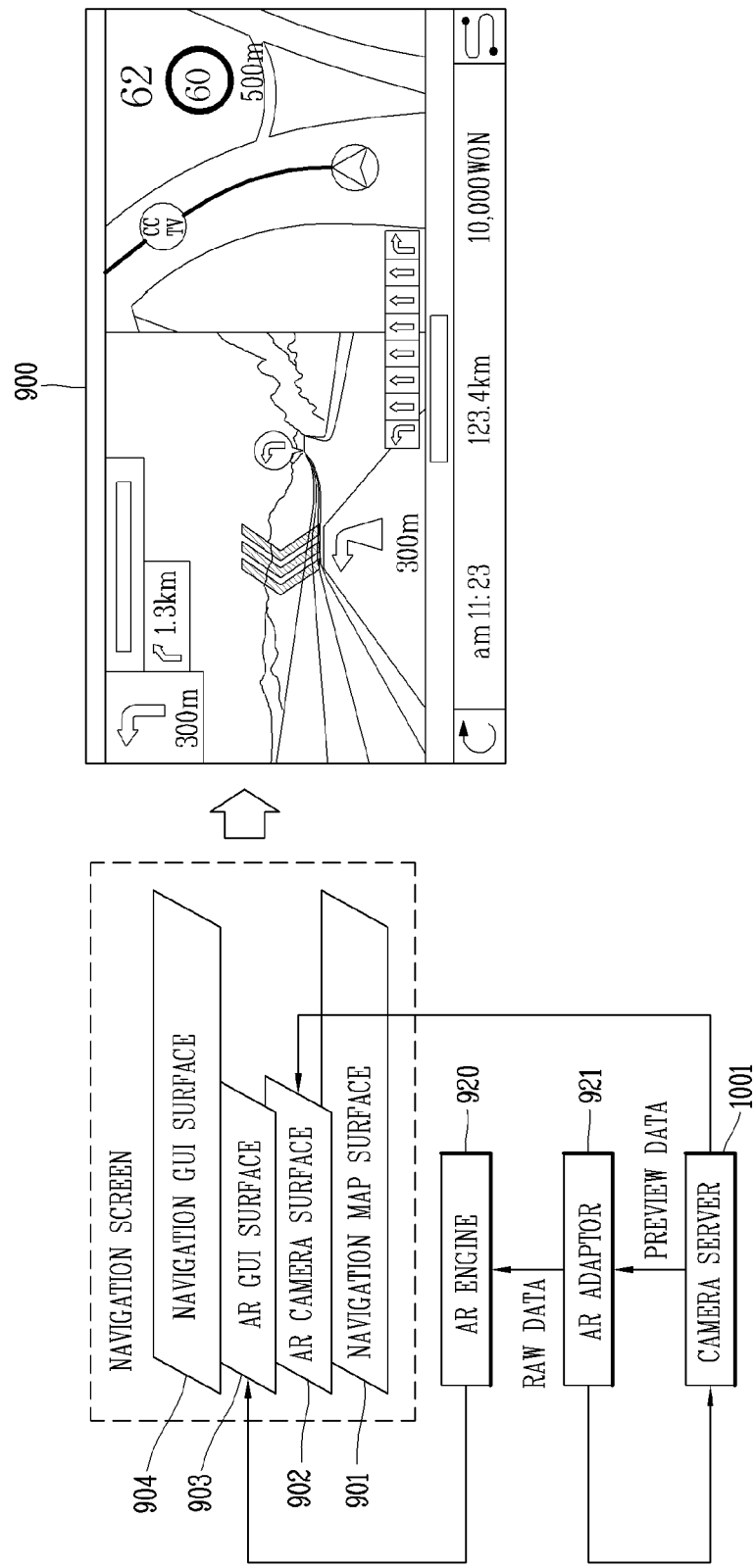
FIG. 10 is a diagram referenced to describe an operation of generating the navigation screen of FIG. 9.

FIG. 9 is a diagram referenced to describe a navigation screen in accordance with an embodiment, and FIG. 10 is a diagram referenced to describe an operation of generating the navigation screen of FIG. 9.

Referring to FIG. 8, the processor 820 may include a navigation engine 910, an augmented reality (AR) engine 920, a navigation application 930, and a sensor and map 940 or may drive such components.

The navigation engine 910 may receive map data and location data (e.g. GPS data) from a vehicle or the like. The navigation engine 910 may perform map matching based on the map data and the GPS data. The navigation engine 910 may perform route planning according to the map matching. The navigation engine 910 may display a map and perform route guidance. The navigation engine 910 may provide route guidance information to the navigation application 930.

The navigation engine 910 may include a navigation controller 911. The navigation controller 911 may receive map matching data, map display data, and route guidance data.

The navigation controller 911 may provide route data, point of interest (POI) data, and the like to the AR engine 920 based on the received map matching data, map display data, and route guidance data.

The navigation controller 911 may provide the route guidance data and a map display frame to the navigation application 930.

The AR engine 920 may include an adapter 921 and a renderer 922. The adapter 921 may receive front image data acquired from a camera (e.g., AR camera), and sensing data acquired from sensors of the vehicle, for example, gyroscopic sensor (Gyroscope), an accelerometer sensor (Accelerometer), a gravity sensor (Gravity), and a geomagnetic sensor (Magnetometer), and/or a temperature sensor (Thermometer).

The AR engine 920 may receive sensing data acquired from an ADAS sensor (e.g., camera, radar, lidar, ultrasound, or sonar). For example, the AR engine 920 may acquire driving-related sensing data, such as a driving direction and speed, a distance from a lane, and the like, as sensing data through the ADAS sensor.

The AR engine 920 may receive high-definition (HD) map data and a program related to the HD map data. Here, the high-definition map (HD Map) is a map for providing information related to detailed roads and surrounding terrains to an autonomous vehicle in advance, and has accuracy within about 10 cm of an error range. The HD map also stores, in 3D digital form, traffic lights, signs, curbs, road marks, and various structures as well as lane-unit information such as road centerlines and boundary lines.

The AR engine 920 may receive acquired sensing data, received data, control data, and related programs from a Telematics Control Unit (TCU) (e.g., third-party service, V2X, ITS communication, etc.).

The TCU of the sensor and map 940 is a communication control device mounted on the vehicle, and may perform communication with, for example, a vehicle to everything (V2X), which is a communication technology of communicating with various elements on roads for autonomous vehicles, (e.g., situation data collectible through V2V and V2I), and Intelligent Transport Systems (ITS) or Cooperative Intelligent Transport Systems (C-ITS), which are cooperative intelligent transport system technologies.

The AR engine 920 may perform calibration on a front image based on data provided from a calibration factor database (DB). The AR engine 920 may perform object detection based on front image data and route data. The AR engine 920 may perform prediction and interpolation based on the detected object.

The renderer 922 may perform rendering based on the route data, the POI data, and result data of the prediction and interpolation. The renderer 922 may provide an AR graphical user interface (GUI) frame and an AR camera frame to the navigation application 930.

The navigation application 930 may generate an AR navigation screen 900.

According to the embodiment of FIG. 8, the processor 820 of the AR display device 800 includes the navigation engine 910, the AR engine 920 and the navigation application 930. Alternatively, the processor 820 may include the AR engine 920 only. In other words, the AR engine 920 only may be executed by the processor 820, and the navigation engine 910 and the navigation application 930 may be executed by one or more processors outside the AR display device 800. Further alternatively, even the AR engine 920 also may be executed by one or more processors outside the AR display device 800. In this alternative scene, the AR display device 800 may only perform receiving rendered images and displaying them on the display 830. If necessary, the AR display device 800 may convert the rendered images suitably for a form factor of the AR display device 800 or decrypt the encrypted rendered images.

Referring to FIG. 9, the AR navigation screen 900 may include a navigation map surface 901, an AR camera surface 902, an AR GUI surface 903, and a navigation GUI surface 904.

The navigation application 930 may create the navigation map surface 901 based on a map display frame provided from the navigation controller 911. The navigation application 930 may create the AR camera surface 902 based on the AR camera frame provided from the renderer 922. The navigation application 930 may create the AR GUI surface 903 based on the AR GUI frame provided from the renderer 922. The navigation application 930 may generate the navigation GUI surface 904 based on the route guidance data provided from the navigation controller 911.

Referring to FIGS. 8 and 10 together, when the navigation application 930 is driven, the navigation application 930 may generate the navigation map surface 901, the AR camera surface 902, the AR GUI surface 903, and the navigation GUI surface 904.

The navigation application 930 may provide parameters of the AR camera surface 902 and parameters of the AR GUI surface 903 to the AR engine 920.

The AR engine 920 may register a callback function to receive front image data from a camera server 1001. The camera server 1001 may be understood as a concept included in a memory of the AR display device 800, for example.

The AR engine 920 may receive and crop the front image data. Cropping may include adjusting a size or position of an image, editing a partial region, adjusting transparency, and the like. The navigation application 930 may display the cropped front image on the AR camera surface 902. The AR engine 920 may perform AR merging in real time. Also, the navigation application 930 may display an AR GUI on the AR GUI surface 903 based on the cropped front image.

Figure 11:
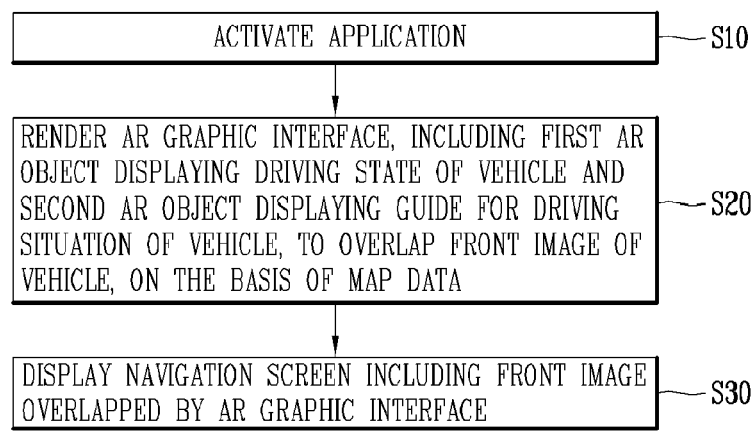
FIG. 11 is a flowchart referenced to describe a method for displaying an AR graphic interface on the navigation screen in accordance with the embodiment.

FIG. 11 is a flowchart referenced to describe a method 1100 for displaying an AR graphic interface on the navigation screen in accordance with the embodiment.

Each process of FIG. 11 may be performed by a processor (or the AR engine) unless otherwise noted. In addition, the processes of FIG. 11 may be performed by including the operations of the navigation engine 910, the AR engine 920, and the navigation application 930 by the processor 820 described above with reference to FIGS. 8 to 10, or at least some of the operations may be performed before or after the processes of FIG. 11.

Referring to FIG. 11, the method starts by activating a preset application (S10).

The preset application may be pre-installed on the AR display device 800 or may be driven by another device/server cooperating therewith, for example, in response to an execution of an AR mode of the vehicle. The preset application may be, for example, a navigation application executed in the AR mode during the driving of the vehicle.

The navigation application, for example, receives a route guidance and a map display frame based on map data and GPS data from the navigation engine, and generates navigation GUI rendering and a map display surface, respectively.

In addition, the navigation application, for example, generates an AR GUI surface by receiving an AR GUI frame from the AR engine, and generates an AR camera surface by receiving an AR camera frame. The navigation application renders the generated map display surface, AR camera surface, and AR GUI surface onto the navigation GUI surface.

The processor generates an AR graphic interface, which includes a first AR object indicating the driving state of the vehicle of the vehicle, and a second AR object indicating a guide for the driving situation of the vehicle, on the basis of the map data acquired from the server, memory, or vehicle and the sensing data of the vehicle, and renders the AR graphic interface to overlap the front image of the vehicle (S20).

The processor may perform AR merging of the AR graphic interface, which is generated in real time, with the front image of the vehicle in real time.

The processor displays (renders) the AR graphic interface in a state in which the first and second AR objects are combined. When a preset condition is satisfied, the processor displays (renders) the AR graphic interface in a state in which the second AR object is separated from the AR graphic interface.

Here, the preset condition may include a case where a change in the driving situation of the vehicle is predicted from a current driving state based on the sensing data of the vehicle. The preset condition may include a case where a change in the driving situation of the vehicle or a situation in which a need for guidance is predicted is detected based on at least one of ADAS sensing data, high-definition map data, and TCU communication data such as V2X, ITS, and C-ITS.

Then, the processor displays the navigation screen including the front image overlapped by the AR graphic interface (S30).

The processor may render the AR graphic interface on the front image in a state in which the first and second AR objects are combined. The processor may generate the AR GUI surface and the AR camera surface, respectively, by providing the AR GUI frame and the AR camera frame corresponding to the AR graphic interface to the navigation application.

Thereafter, the generated AR GUI surface and the AR camera surface are rendered on the navigation GUI surface, so that the front image rendered with the AR graphic interface is included (displayed) on the navigation screen.

Meanwhile, the AR graphic interface may vary depending on a driving situation that is predicted to change based on the map data and the sensing data of the vehicle.

At this time, the AR graphic interface that varies is displayed with the plurality of AR objects separated, to provide a driver of the vehicle with intuitive guidance for the current driving state and the driving situation that is predicted to change.

Figure 12A:
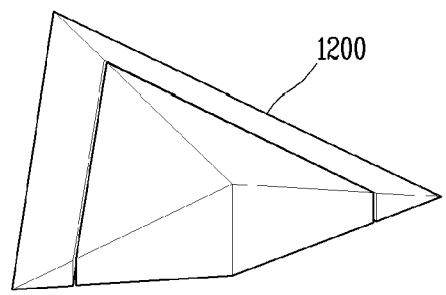
FIGS. 12A and 12B are diagrams illustrating an example of the AR graphic interface according to the embodiment of the present disclosure, which are referenced to describe separation and combination of first and second AR objects.
Figure 12B:
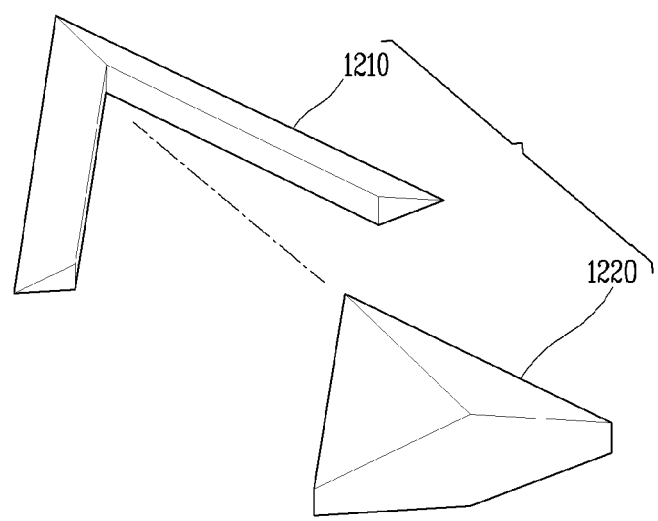

FIGS. 12A and 12B are diagrams illustrating an example of the AR graphic interface according to the embodiment of the present disclosure, which are referenced to describe separation and combination of the first and second AR objects based on a predicted change in driving situation.

Referring to the drawings, an AR graphic interface 1200 may be implemented as an AR image of a specific shape in a 3D form, and the AR image may be used to indicate road information, and the like in addition to a current driving direction, a driving speed, and steering information of the vehicle.

The AR graphic interface 1200 may be implemented in the form in which a first object and a second object are combined with each other.

Here, the first object may be implemented in the form of, for example, a 3D spade (e.g., a shovel-shaped image), and the second object may be implemented in the form of a 3D chevron (e.g., A or V-shaped image) extending from the first object. However, this does not mean that the first and second objects are limited to these shapes.

The first object and the second object of the AR graphic interface 1200 may be combined such that an inner frame of the second object and an outer frame of the first object extend to be in contact with each other. In this case, the first and second objects may be expressed in different colors so as to be visually distinguishable from each other.

The AR graphic interface 1200 may be rendered such that the first and second objects move at the same distorted angle or different distorted angles in a combined state, to indicate the current driving state of the vehicle.

The generated AR graphic interface 1200 is displayed to overlap the front image of the vehicle included in the navigation screen. Specifically, the processor 820 generates the AR graphic interface 1200 indicating the current driving state of the vehicle based on the map data and the sensing data of the vehicle, renders the AR graphic interface 1200 based on route, POI information, etc., and sends the rendered AR graphic interface 1200 to the navigation application 930. Accordingly, the AR graphic interface 1200 is displayed to overlap the front image of the vehicle included in the navigation screen.

Referring to FIG. 12B, the processor 820 may separate the first and second AR objects 1210 and 1220 of the AR graphic interface based on a driving situation that is predicted to change based on the map data and the sensing data of the vehicle, render the separated second AR object 1210 to display guidance related to the changed driving situation, and update the AR GUI surface and the AR camera surface of the navigation application 930.

The condition in which the first and second AR objects 1210 and 1220 are separated may include a case in which a change in driving situation of the vehicle is predicted from the current driving state of the vehicle based on the sensing data of the vehicle.

Alternatively, the condition in which the first and second AR objects 1210 and 1220 may include a case where a change in the driving situation of the vehicle or a situation in which a need for guidance is predicted is detected based on at least one of ADAS sensing data, high-definition map data, and TCU communication data such as V2X, ITS, and C-ITS.

Meanwhile, the separated second AR object 1210 is displayed by extending from a display position of the first AR object 1220. Since the first AR object 1220 indicates the current driving state of the vehicle (e.g., the current position and driving direction of the vehicle), the driver can intuitively determine a time point and a driving direction to drive the vehicle according to the guidance indicated by the second AR object 1210.

A spaced distance between the first and second AR objects 1210 and 1220 may correspond to a time point or distance at which the driving situation of the vehicle is predicted to change.

Also, although not illustrated in detail, the separated second AR object 1210 may be expressed by a plurality of fragments. A predetermined interval may be maintained between the plurality of fragments.

In addition, a direction indicated by each of the plurality of fragments may gradually point to a predicted situation occurrence location (or situation end location). For example, if the separated second AR object 1210 is implemented by a total of 5 fragments, each of the 5 fragments may point to the same location (e.g., a predicted situation occurrence location) at different distorted angles.

The plurality of fragments may be displayed in the form of moving a specific distance ahead of the first AR object 1220. That is, the plurality of fragments does not fixedly appear at a specific location or time point but are implemented to provide driving guidance according to a driving situation predicted during movement on the basis of the current location and driving state of the vehicle.

A moving speed of the plurality of fragments may correspond to a degree (e.g., driving speed) that the vehicle approaches closely.

Also, the number and/or display length of the plurality of fragments may be proportional to a time or distance that a predicted situation continues. For example, a larger number of fragments may be included or a total display length may be longer in the case where the situation continues for a long time than that in the case where the situation does not continue for a long time.

A fragment, which is close to the first AR object 1220 among the plurality of fragments, displays a guide to be associated with the driving state indicated by the first AR object 1220.

A fragment, which is farthest away from the first AR object 1220 among the plurality of fragments, displays a guide to be associated with a predicted situation.

That is, the plurality of fragments of the separated second AR object 1210 provides a guide for a situation, which is predicted from the current driving state corresponding to the first AR object 1220, in a more gradual and seamless manner.

When the situation corresponding to the condition that the second AR object 1210 is separated ends, the separated second AR object 1210 is then displayed back in the combined state with the first AR object 1220. That is, the AR graphic interface 1200 as illustrated in FIG. 12A may be displayed again.

The term 'combined state' in the present description means that the first and second AR objects are connected to each other on the screen, or the two AR objects are put relatively closer to each other on the screen than the 'separated state' where the two AR objects are separated from each other. Similarly, the meaning of the expression 'joining the first and second AR objects to each other' in the present description comprises not only connecting the first and second AR objects to each other but also putting the first and second AR objects close together with a relatively smaller gap between them than a case of 'separating the second AR object from the first AR object'.

Hereinafter, the AR display device 800 according to the present disclosure may recognize that the vehicle has entered a parking area including a charging area, and search for a parking available area based on at least one of sensing data (e.g., ADAS sensing data) and control data of the parking area, and display the AR graphic interface by varying it in real time to guide the vehicle to the searched parking available area.

Figure 13:
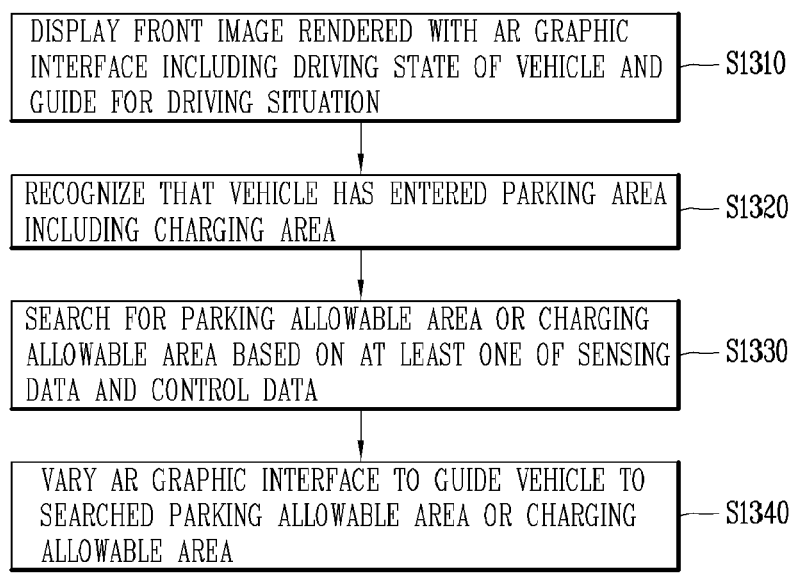
FIG. 13 is a flowchart referenced to explain a method of providing a UX related to parking/charging of a vehicle using an AR graphic interface according to an embodiment of the present disclosure.

FIG. 13 is a flowchart referenced to explain a method 1300 of providing a UX related to parking/charging of a vehicle using an AR graphic interface, as a method for operating an AR display device according to an embodiment of the present disclosure.

Each step illustrated in FIG. 13 may be performed by the processor 820 of the AR display device 800 unless otherwise noted. In addition, each step may be performed by including some of the operations of the navigation engine 910, the AR engine 920, and the navigation application 930 described above with reference to FIGS. 8 to 10, or at least some of the operations may be performed before or after the steps of FIG. 13.

Referring to FIG. 13, while the vehicle is driving, the AR display device 800 displays a front image rendered with an AR graphic interface, which indicates (or informs) a driving state of the vehicle and a guide for a driving situation (S1310).

Specifically, the processor 820 may execute a preset application (e.g., navigation application), and render an AR graphic interface, in which a first AR object indicating the driving state of the vehicle and a second AR object providing a guide for the driving situation of the vehicle, to overlap a front image acquired through an AR camera.

The processor 820 may output the front image rendered with the AR graphic interface on the display 830 (e.g., an image reflected on an LCD screen, an image of a real space shown on a windshield/dashboard of the vehicle, a digital twin 3D image, etc.).

The AR display device 800 may recognize that the vehicle has entered a parking area including a charging area (S1320).

In this disclosure, the term 'parking area' is used, as aforementioned, to include both a charging station including chargers and a parking lot including parking spaces. In addition, the term 'parking area' disclosed herein may include both a case of including a control server and a case of not including a control server.

In the case of a parking area without a control server (or in which the control server does not operate), the AR display device 800 may recognize that the vehicle has entered the parking area based on vehicle sensing data, map data, and/or ADAS sensing data of the vehicle.

In the case of a parking area including a control server, the control server may recognize the entry of the vehicle based on control data, namely, sensing data of a sensor (e.g., camera, lidar, radar, etc.) disposed in the parking area, and/or may provide the control data to the AR display device 800 such that the AR display device 800 can recognize the entry of the vehicle into the parking area.

The processor 820 may generate and output an indication that the vehicle has entered the parking area together with or through an AR graphical interface.

Subsequently, the processor 820 may search for a parking available area or a charging available area based on at least one of sensing data of the vehicle and control data of the parking area (S1330).

In the case of a parking area without a control server (or in which the control server does not operate), the processor 820 may search for a parking available area or charging available area within the parking area based on sensing data of the vehicle and/or ADAS sensing data of the vehicle.

In the case of a parking area including a control server, the control server may search for a parking available area or a charging available area within the parking area based on control data, namely, sensing data of a sensor (e.g., camera, lidar, radar, etc.) installed in the parking area, and provide a result of the search to the AR display device 800.

In this way, when the parking available area or the charging available area is searched through the sensing data of the vehicle and/or ADAS sensing data or the control data, the processor 820 may change the AR graphic interface to guide the vehicle to the searched parking available area or charging available area (S1340).

The AR graphic interface may provide a UX in a form in which the first and second AR objects are separated in order to guide the vehicle to the parking available area or the charging available area. In addition, the AR graphic interface may further include a third AR object together with the first and second AR objects to display a specific event in the parking area.

FIGS. 14A, 14B, 14C, and 14D are conceptual views illustrating a process of guiding a parking available area using an AR graphic interface changes based on ADAS sensing data of the vehicle according to an embodiment of the present disclosure.

The AR display device 800 according to the present disclosure may provide (output) the AR graphic interface by changing it in real time based on ADAS sensing data of the vehicle together with sensing data of the vehicle (e.g., CAN data (steering wheel angle, driving speed (Speed), yaw rate (Yawrate))), GPS location/direction information, and map data (e.g., navigation/map data (lane geometry)), to guide the vehicle to the parking available area or the charging available area.

ADAS stands for an advanced driver assistance system (ADAS), and ADAS sensing data refers to sensing data acquired through an ADAS (system). Through ADAS, both objects and environments around the vehicle can be sensed.

The processor 820 may receive ADAS sensing data of the vehicle, sensing data of the vehicle (e.g., CAN data), and map data such as navigation/map/GPS data, etc., and provide auxiliary functions, which can be provided based on the received data, through the separated second AR object. At this time, the separated second AR object may be displayed together with additional information (e.g., charging information such as a remaining charging time, a charging rate, etc.).

The processor 820 may search for a parking available area or a charging available area based on ADAS sensing data when the vehicle enters a parking lot/charging station.

At this time, when there is a plurality of parking available areas or charging available areas, an optimal parking space/charger that meets predetermined criteria (e.g., proximity to a current location of the vehicle, proximity to an exit, fast charging priority, etc.) may be automatically selected or a plurality of locations (or routes) for an optimal parking space/charger may be provided to be selectable by a user input.

Thereafter, when the vehicle enters a location of a parking space/charger selected automatically or by a user input within a predetermined distance, the processor 820 updates the AR graphic interface such that the separated second AR object is moved to the location of the selected parking space/charger and displays a guidance route connected from the current location of the vehicle to the location of the parking space/charger.

To this, the AR graphic interface may further include a third AR object. Here, the third AR object may be rendered by the process 820 at the position of the searched available parking area in the front image. Also, the third AR object may display the searched available parking area in a selectable manner.

When the vehicle arrives at (or in front of) the selected parking space/charger along the guidance route by the separated second AR object, the processor 820 provides the AR graphic interface in which the second AR object is moved and joined into the first AR object again.

After this, the vehicle enters a parking mode. The driver can intuit the entry into the parking mode by confirming the recombined first and second AR objects (and/or based on additional information ('Parking mode executed') provided together with the rejoined objects).

Hereinafter, an embodiment of searching for a parking available area and providing route guidance using an AR graphic interface that changes based on ADAS sensing data will be described in detail, with reference to FIGS. 14A to 14D.

Figure 14A:
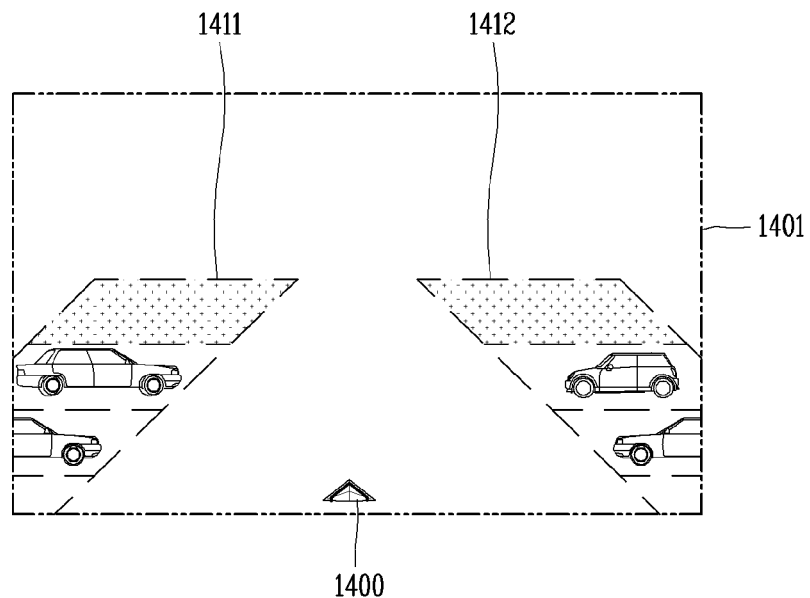
FIGS. 14A, 14B, 14C, and 14D are conceptual views illustrating a process of guiding a parking available area by varying an AR graphic interface based on ADAS sensing data according to an embodiment of the present disclosure.

Referring to FIG. 14A, when the vehicle enters a parking lot/charging station, the processor 820 searches for front, rear, and both lateral sides of the vehicle through an ADAS system (e.g., based on ADAS sensing data). Accordingly, the processor 820 may search for a parking available area or a charging available area based on the ADAS sensing data, in response to the vehicle entering the parking lot/charging station.

Although not illustrated, during the search, an animation effect that the second AR object is separated from the first AR object and turns 360 degrees relative to the first AR object may be output. When the search ends (e.g., search success/failure), the first and second AR objects are displayed in the joined form again.

The processor 820 may indicate, on the front image 1401 of the vehicle, adjacent parking available areas 1411 and 1412, which have been searched for relative to the current location of the vehicle based on the ADAS sensing data. At this time, the AR graphic interface 1400 displays the current driving state of the vehicle in the joined form of the first and second AR objects.

Figure 14B:
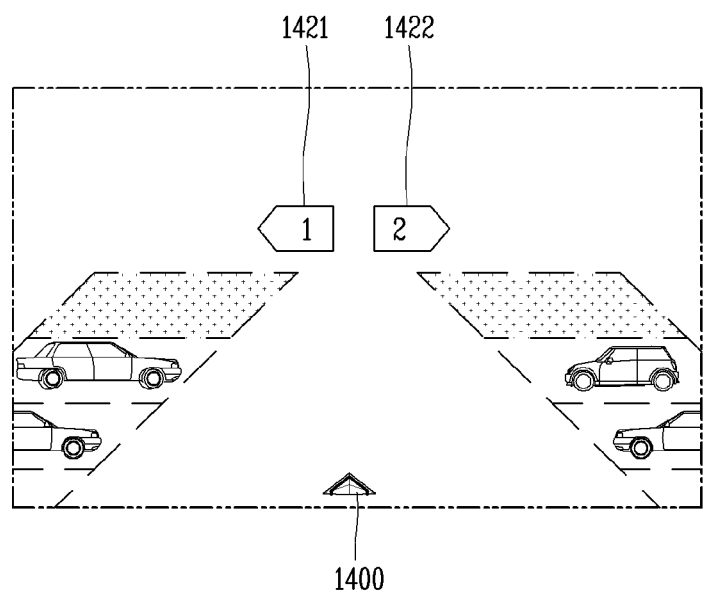

Next, as illustrated in FIG. 14B, the processor 820 may display selection options 1421 and 1422 for the searched plurality of parking available areas 1411 and 1412 on the front image of the vehicle. At this time, the selection options 1421 and 1422 may be displayed together with additional information (e.g., driving distance, proximity to the current location of the vehicle, proximity to an exit, etc.). Here, the selection options 1421 and 1422 for the searched plurality of parking may refer to a fourth AR object rendered by the process 820.

The processor 820 selects one parking available area (e.g., 1412) based on an input to the selection option 1421, 1422. Accordingly, the second AR object is separated and moves to a location of the selected parking available area 1412.

Figure 14C:
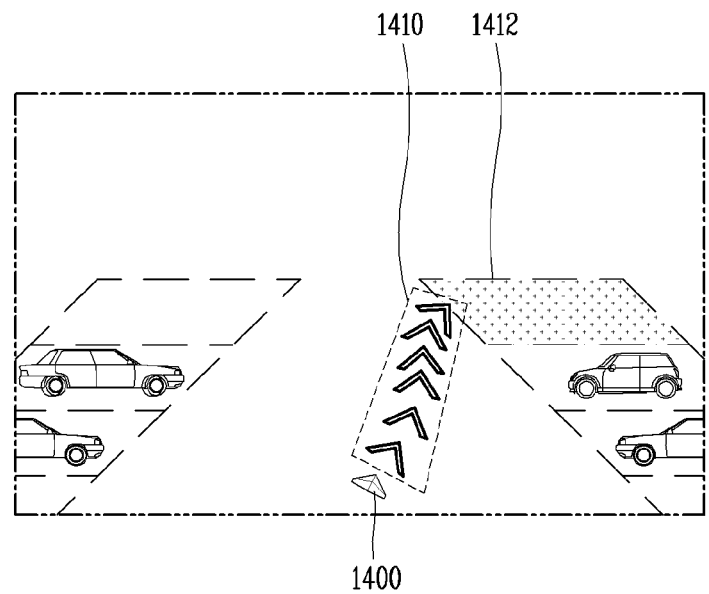

Afterwards, as illustrated in FIG. 14C, the processor 820 provides a guidance route by generating a guide trajectory, which connects the first AR object indicating the current location of the vehicle to the location of the selected parking available area 1412, through the second AR object 1410.

In this case, the guidance route may be generated in a direction in which parking is easy, considering parking of the vehicle to be followed.

Figure 14D:
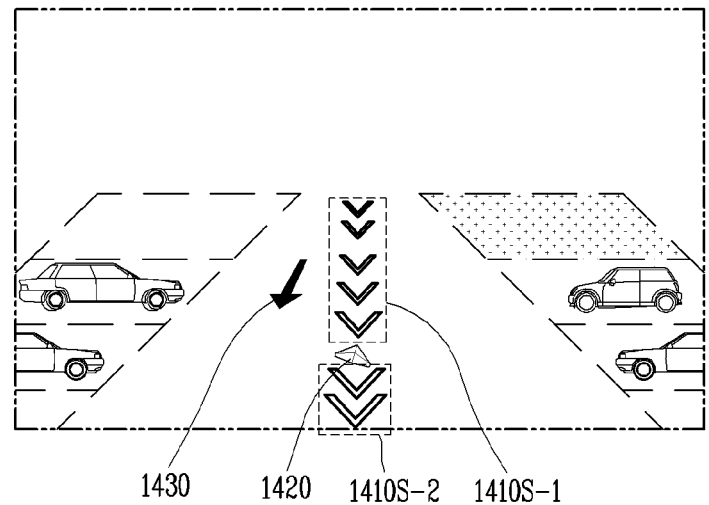

On the other hand, as illustrated in FIG. 14D, when the vehicle enters in an opposite direction of driving or when a direction of entering the selected parking available area 1412 is opposite to the driving direction of the vehicle, the processor 820 may display a guidance indicating that the entry is prohibited through the separated second AR object.

The processor 820 may recognize that the vehicle has entered in the prohibited driving direction based on the current location and the driving state of the vehicle, and separate the second AR object to output a warning notification and guide an allowed driving direction.

Specifically, since the first AR object 1420 indicates the current driving direction of the vehicle through a turn amount (an amount that a steering wheel turns), the first AR object 1420 is displayed to point to the selected parking available area 1412.

The separated second AR object 1410S-1, 1410S-2 does not face the selected parking available area 1412, but turns to point to the same direction as an entry direction 1430. That is, the separated second AR object 1410S-1, 1410S-2 provides the allowed driving direction by pointing to a direction opposite to the direction pointed by the first AR object 1420.

The separated second AR object 1410S-1, 1410S-2 may be divided into both directions with the first AR object 1420 interposed therebetween.

A first part 1410S-1 of the separated second AR object connects the location of the selected parking available area 1412 and the first AR object 1420. Also, a second part 1410S-2 of the separated second AR object guides a route from the first AR object 1420 toward the allowed driving direction. At this time, both trajectories of the first and second parts 1410S-1 and 1410S-2 are drawn in the direction opposite to the direction indicated by the first AR object 1420, that is, in the allowed driving direction.

The separated second AR object 1410S-1, 1410S-2 may display an entry prohibition warning through color change, shape change, blinking, and highlighting.

For example, the color (e.g., green) of the separated second AR object when guiding the route for the entry direction may be different from the color (e.g., orange-based color or red) of the separated second AR object when guiding the warning of the prohibited entry direction.

The processor 820 may change a display method and/or notification level of the entry prohibition warning according to driving situations of the vehicle (e.g., another vehicle entering in the entry direction, a parking congestion level, a distance from the vehicle, etc.).

The driver can intuitively change the driving direction of the vehicle, decelerate the vehicle, stop the driving of the vehicle, etc. by checking the second AR object providing the warning guide for the prohibited entry direction.

Then, when the vehicle travels in the entry direction (or in the allowed driving direction) along the guide trajectory drawn by the second part 1410S-2 of the separated second AR object, the entry prohibition warning disappears, and the separated second AR object 1410S-1, 1410S-2 is restored to a previous state in color, shape, and the like, and displayed in the combined state with the first AR object again.

Alternatively, the processor 820 may update the AR graphic interface to display a location of a parking available area, which is searched for again based on the ADAS sensing data, in a peripheral area in the allowed driving direction.

FIGS. 15A, 15B, 15C, and 15D are conceptual views illustrating a process of guiding a parking available area using an AR graphic interface changed based on control information according to an embodiment of the present disclosure.

The AR display device 800 according to the present disclosure may provide (output) the AR graphic interface by changing it in real time based on control data of a parking lot/charging station together with sensing data of the vehicle (e.g., CAN data (steering wheel angle, driving speed (Speed), yaw rate (Yawrate)), GPS location/direction information, and map data (e.g., navigation/map data (lane geometry))), to guide the vehicle to the parking available area or the charging available area.

The control data includes data and information generated by the control server based on sensing data of sensors (e.g., lidar, camera, radar, location sensor platform using UWB/BLE, etc.) disposed in the parking lot/charging station.

When the vehicle enters the parking lot/charging station, the control server may be connected to the AR display device 800, and control events (situations, operations, functions, etc.) that occur in the parking lot/charging station and devices (e.g., sensors, chargers, other linked devices/equipment, etc.) installed in the parking lot/charging station through a digital twin technology.

The control server may transmit the obtained control data or information or data generated based on the control data to the vehicle 100 or the AR display device 800.

A digital twin refers to a digital data model which is a replica of a real-world object (thing, space, environment, process, procedure, etc.) and behaves identically in real time. The digital twin can represent virtual models of physical assets, such as objects, spaces, environments, people, and processes, using software to operate or behave identically to their real-world counterparts.

The control server may include an internal 3D shape of a parking lot/charging station building through the digital twin, and provide information related to vehicle entering, charging/leaving, entry/exit route, etc. based on the sensing data of the sensors (e.g., lidar, camera, radar, location sensor platform using UWB/BLE, etc.) disposed in the parking lot/charging station.

The processor 820 may receive control data, sensing data of the vehicle (e.g., CAN data), and map data such as navigation/map/GPS data, etc., and provide auxiliary functions, which can be provided based on the received data, through the separated second AR object. At this time, the separated second AR object may be displayed together with additional information (e.g., charging information such as a remaining charging time, a charging rate, etc.).

The processor 820 may recognize a parking available area or a charging available area based on the data, when the vehicle enters the parking lot/charging station.

At this time, when there is a plurality of parking available areas or charging available areas, an optimal parking space/charger that meets predetermined criteria (e.g., proximity to the current location of the vehicle, proximity to the exit, fast charging priority, etc.) may be selected automatically or through a user input.

When the vehicle enters a location of a parking space/charger selected automatically or through a user input within a predetermined distance, the processor 820 updates the AR graphic interface such that the separated second AR object is moved to the location of the selected parking space/charger and displays a guidance route connected from the current location of the vehicle to the location of the parking space/charger.

Afterwards, when the vehicle arrives at (or in front of) the selected parking space/charger along the guidance route by the separated second AR object, the processor 820 updates the AR graphic interface such that the second AR object is moved and combined with the first AR object again.

After this, the vehicle enters a parking mode. The driver can intuit the entry into the parking mode by confirming the rejoined first and second AR objects (and/or based on additional information ('Parking mode executed') provided together with the recombined objects).

Hereinafter, an embodiment of searching for a parking available area and providing a route guidance using an AR graphic interface that changes based on control data of a parking lot/charging station will be described in detail, with reference to FIGS. 15A to 15D.

Figure 15A:
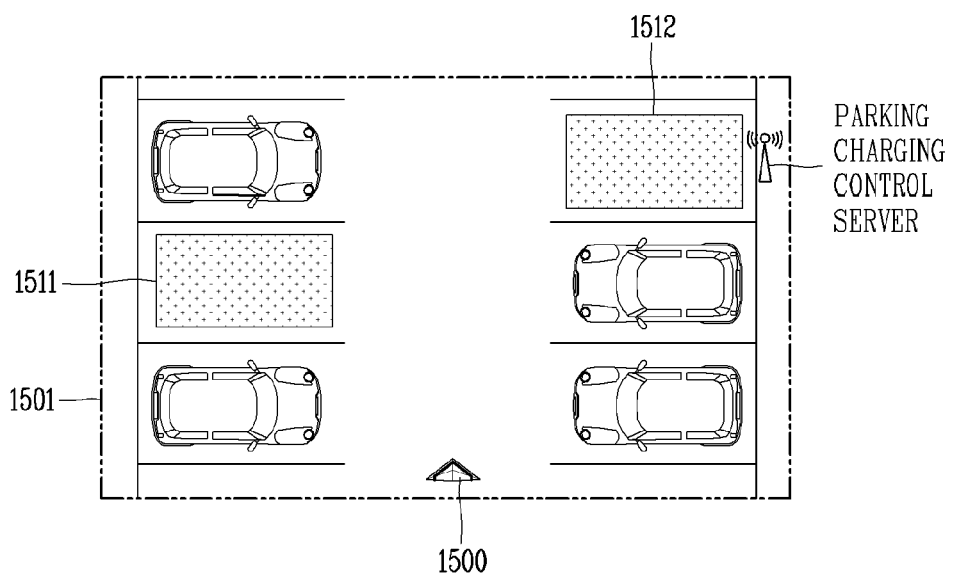
FIGS. 15A, 15B, 15C, and 15D are conceptual views illustrating a process of guiding a parking available area by varying an AR graphic interface based on control information according to an embodiment of the present disclosure.

Referring to FIG. 15A, when the vehicle enters a parking lot/charging station, the control server detects the entry of the vehicle and searches for a parking available area or charging available area (e.g., using a digital twin). Accordingly, the processor 820 may recognize a result of the search for the parking available area or the charging available area based on control data, in response to the entry of the vehicle into the parking lot/charging station.

Although not illustrated, during the search by the control server (or until receiving the control data from the control server), an animation effect that the second AR object is separated from the first AR object and turns 360 degrees relative to the first AR object may be output. When the search ends (e.g., search success/failure), the first and second AR objects are displayed in the joined form again.

The processor 820 may indicate, on the front image 1501 of the vehicle, adjacent parking available areas 1511 and 1512, which have been searched for by the control server relative to the current location of the vehicle based on the control data. At this time, the AR graphic interface 1500 displays the current driving state of the vehicle in the joined form of the first and second AR objects.

Figure 15B:
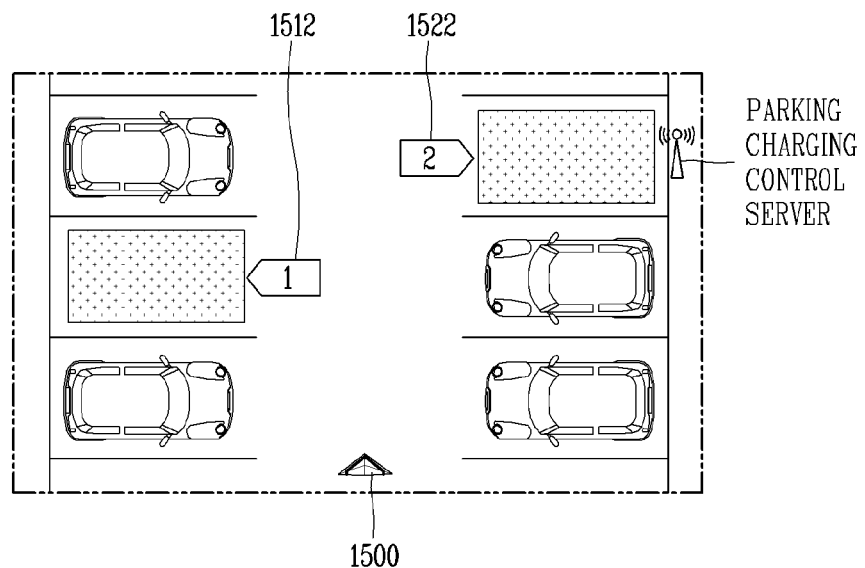

Next, as illustrated in FIG. 15B, the processor 820 may display selection options 1521 and 1522 for the searched plurality of parking available areas 1511 and 1512 on the front image of the vehicle. At this time, the selection options 1521 and 1522 may be displayed together with additional information (e.g., driving distance, proximity to the current location of the vehicle, proximity to the exit, etc.).

The processor 820 selects one parking available area (e.g., 1512) based on an input to the selection option 1521, 1522. The processor 820 then separates the second AR object and moves the separated second AR object to a location of the selected parking available area 1512.

Figure 15C:
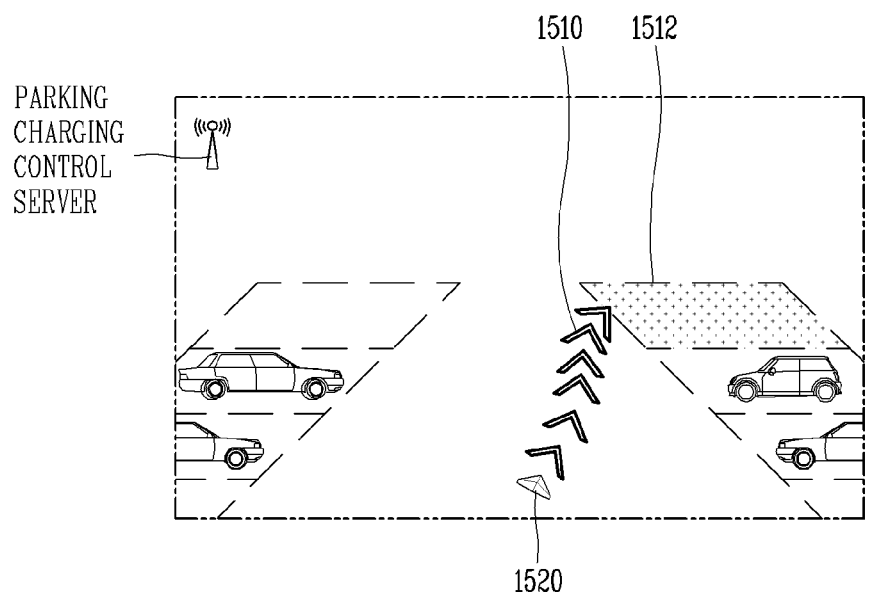

Afterwards, as illustrated in FIG. 15C, the processor 820 provides a guidance route by generating a guide trajectory, which connects the first AR object 1510 indicating the current location of the vehicle to the location of the selected parking available area 1512, through the second AR object 1510.

In this case, the guidance route may be generated in a direction in which parking is easy, considering parking of the vehicle to be followed.

Figure 15D:
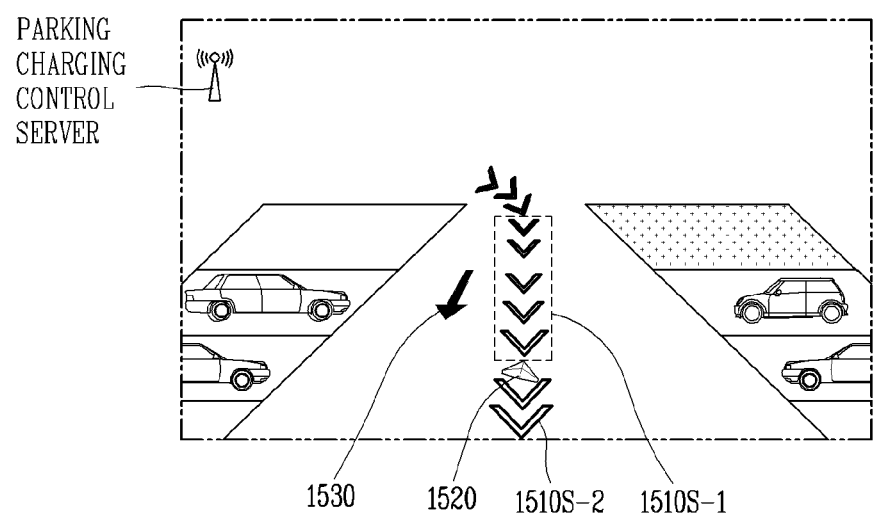

On the other hand, as illustrated in FIG. 15D, when the vehicle enters in an opposite direction of driving or when a direction of entering the selected parking available area 1512 is opposite to the driving direction of the vehicle, the processor 820 may display a guidance indicating that the entry is prohibited through the separated second AR object.

The processor 820 recognizes that the vehicle has entered in the prohibited driving direction based on the current location and the driving state of the vehicle, and separate the second AR object to output a warning notification and guide an allowed driving direction.

Specifically, since the first AR object 1520 indicates the current driving direction of the vehicle through a rotated degree (or a degree of rotation), the first AR object 1520 is displayed to point to the selected parking available area 1512.

The separated second AR object 1510S-1, 1510S-2 does not face the selected parking available area 1512, but turns to point to the same direction as an entry direction 1530 (or an available driving direction). That is, the separated second AR object 1510S-1, 1510S-2 provides an allowed driving direction by pointing to a direction opposite to the direction pointed by the first AR object 1520.

The separated second AR object 1510S-1, 1510S-2 may be divided into both directions with the first AR object 1520 interposed therebetween.

A first part 1510S-1 of the separated second AR object connects the location of the selected parking available area 1512 and the first AR object 1520. A second part 1510S-2 of the separated second AR object guides a route from the first AR object 1520 toward the allowed driving direction. At this time, both trajectories of the first and second parts 1510S-1 and 1510S-2 are drawn in the direction opposite to the direction indicated by the first AR object 1520, that is, in the allowed driving direction.

The separated second AR object 1510S-1, 1510S-2 may display an entry prohibition warning through color change, shape change, blinking, and highlighting.

For example, the color (e.g., green) of the separated second AR object when guiding the route for the entry direction may be different from the color (e.g., orange-based color or red) of the separated second AR object when guiding the warning of the prohibited entry direction.

The processor 820 may change a display method and/or notification level of the entry prohibition warning according to driving situations of the vehicle (e.g., another vehicle entering in the entry direction, a parking congestion level, a distance from the vehicle, etc.).

The driver can intuitively change the driving direction of the vehicle, decelerate the vehicle, stop the driving of the vehicle, etc. by checking the second AR object displaying the warning guide for the prohibited entry direction.

Then, when the vehicle travels in the entry direction (or in the allowed driving direction) along the guide trajectory drawn by the second part 1510S-2 of the separated second AR object, the entry prohibition warning disappears, and the separated second AR object 1510S-1, 1510S-2 is restored to a previous state in color, shape, and the like, and displayed in the combined state with the first AR object again.

Alternatively, the processor 820 may update the AR graphic interface to display a location of a parking available area, which is searched for again based on the control data, in a peripheral area in the allowed driving direction.

Figure 16A:
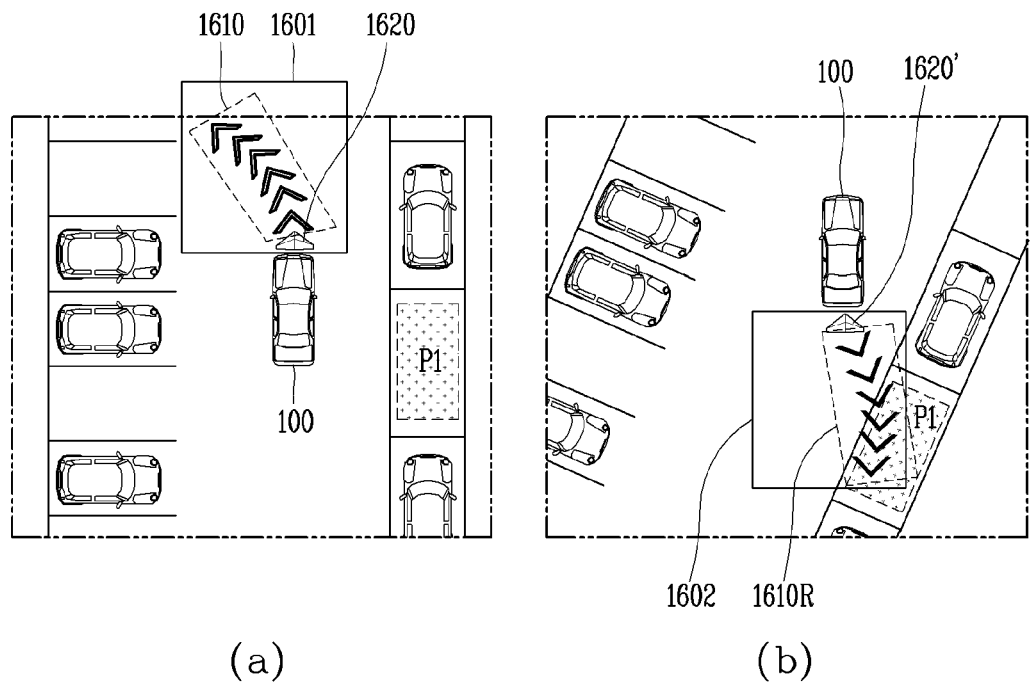
FIGS. 16A and 16B are conceptual views related to updating an AR graphic interface according to a parking type according to an embodiment of the present disclosure.
Figure 16B:
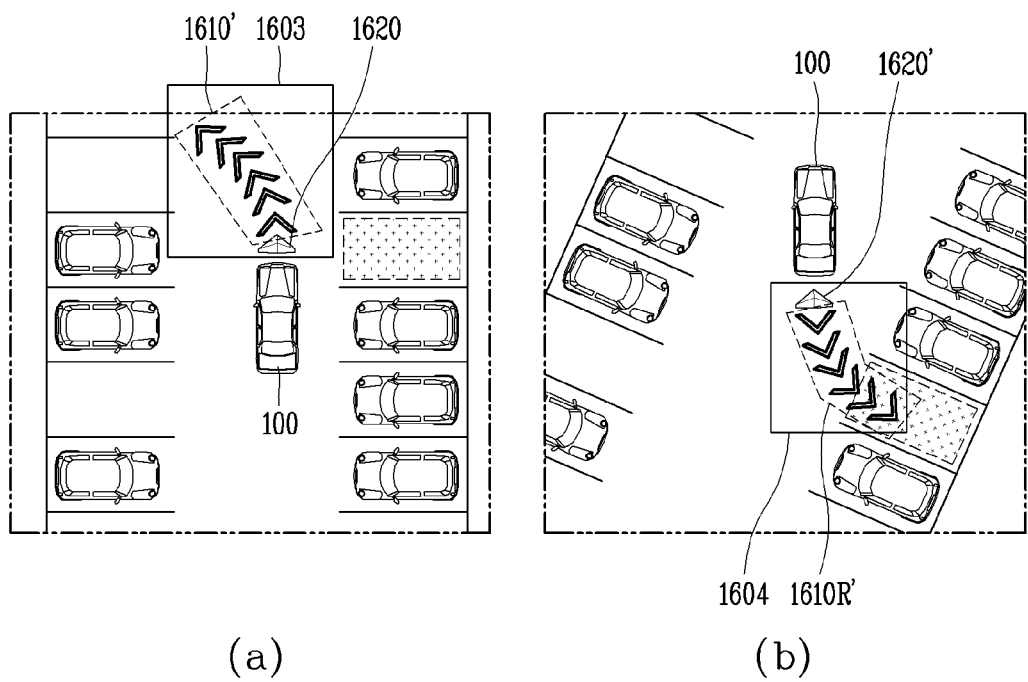

FIGS. 16A and 16B are conceptual views related to updating an AR graphic interface according to a parking type according to an embodiment of the present disclosure.

When the vehicle arrives at a parking area or charging area through the separated second AR object, the separated second AR object is joined to the first AR object again, and then a parking mode is executed. In the parking mode, a guidance route for parking is provided using the AR graphical interface, and varies depending on a type of parking.

Types of parking include, for example, front end parking (perpendicular parking), reverse parking (perpendicular back parking), angular parking, parallel parking (lateral parking), and the like.

When a selected parking space/charger has types of front end parking and angular parking, it is sufficiently guided by one parking guidance route through the AR graphic interface. Therefore, hereinafter, a method of providing a UX for guiding parking will be described in detail based on examples of reverse parking (perpendicular back parking) and parallel parking (lateral parking) that need to change a driving direction and include reverse driving.

The processor 820 of the AR display device 800 according to the present disclosure may determine an available parking type when the vehicle approaches a selected parking area (or selected charging area), and update the AR object interface such that the second AR object is separated to display a parking guidance line for the vehicle to be driven according to the determination.

The separated second AR object displays a driving direction and a driving distance for the vehicle to be driven according to the determined parking type. The first AR object displays a current driving direction and steering angle (turn amount or rotational angle) of the vehicle that is traveling along the displayed parking guidance line (route).

Specifically, when the parking type of the selected parking area (or charging area) is determined, the processor 820 may calculate a predicted change point to reverse driving based on the current location of the vehicle and a location of the selected parking area (and ADAS sensing data).

Here, the change point means a point where the driving direction of the vehicle should change to park the vehicle in the selected parking area (or charging area). The change point refers to a location and a steering angle at which the driving direction of the vehicle should change from forward driving (reverse driving) to reverse driving (forward driving).

Continuously, the processor 820 displays a first guide line toward the change point through the separated second AR object. When the current location of the vehicle corresponding to the first AR object approaches the change point, the processor 820 then updates the AR graphic interface to display a second guide line for the vehicle to travels backward into the selected parking area through the second AR object.

When it is detected that the vehicle is traveling away from the first guide line or the second guide line, the processor 820 changes a color, shape, etc. of the first guide line and/or the second guide line to induce the vehicle to travel along the guide line.

The first AR object displays the current steering angle of the vehicle. Also, when the steering angle of the vehicle is changed, the first and second guide lines are updated corresponding to the changed steering angle. Accordingly, the processor 820 may display a guide for inducing a current steering angle change of the vehicle to follow the first and second guide lines through the first AR object.

(a) and (b) of FIG. 16A illustrate an example of a UX for providing a parking guidance through the AR graphic interface during parallel parking (lateral parking). The parallel parking (lateral parking) is made by combination of forward driving and reverse driving.

First, while the vehicle 100 is traveling along a first guide line guiding the driving in a forward direction, the front image 1601 includes a first AR object 1620 indicating the forward driving of the vehicle and a separated second AR object 1610 indicating the first guide line.

The second AR object 1610 includes a change point to reverse driving, and the first guide line displayed by the second AR object 1610 connects the first AR object 1620 and the change point to the reverse driving. The change point may be, for example, a destination of the first guide line. The change point may be displayed in a color and shape different from those of other guide trajectories constituting the first guide line.

When the vehicle approaches the change point to the reverse driving along the first guide line displayed by the second AR object 1610, the processor 820 changes the color and shape of the change point to provide a notification for the change into the reverse driving. Along with this, additional information related to the change point (e.g., 'Change to reverse (R) driving') may be displayed.

When the vehicle arrives at the change point, the processor 820 updates the second AR object 1610 to generate and display a second guide line toward a target parking area PI in a reverse driving direction of the vehicle, instead of displaying the first guide line.

A front image 1602 of the vehicle includes a second AR object 1610R displaying the second guide line for guiding up to the target parking area PI in the reverse driving direction of the vehicle together with a first AR object 1620' displaying the current driving direction (forward driving) of the vehicle.

In this case, the color of the second guide line and/or a direction indicated by the guide trajectories of the second guide line may be differently displayed from the color of the first guide line and/or a direction indicated by the guide trajectory of the first guide line. Accordingly, the driver can intuitively recognize a guide for controlling the forward and reverse driving of the vehicle.

(a) and (b) of FIG. 16B illustrate an example of a UX for providing a parking guidance through the AR graphic interface during reverse parking (perpendicular back parking). The reverse parking (perpendicular back parking) is similarly made by combination of forward driving and reverse driving, but a turn amount (or rotational angle) during the reverse driving is larger than that of the parallel parking (lateral parking).

While the vehicle 100 is traveling along a first guide line guiding the driving in a forward direction, the front image 1603 includes a first AR object 1620 indicating forward driving of the vehicle and a separated second AR object 1610' indicating the first guide line. The second AR object 1610' may display information related to a parking type (e.g., reverse parking) as additional information.

The second AR object 1610' includes a change point to reverse driving, and the first guide line displayed by the second AR object 1610' connects the first AR object 1620 and the change point to the reverse driving. The change point may be, for example, a destination of the first guide line. The change point may be displayed in a color and shape different from those of other guide trajectories constituting the first guide line.

When the vehicle approaches the change point to the reverse driving along the first guide line displayed by the second AR object 1610', the processor 820 changes the color and shape of the change point to provide a notification for the change into the reverse driving. Along with this, additional information related to the change point (e.g., 'Change to reverse (R) driving') may be displayed.

When the vehicle arrives at the change point, the processor 820 updates the second AR object 1610' to generate and display a second guide line toward a target parking area in a reverse driving direction of the vehicle, instead of displaying the first guide line.

At this time, a curve of a guide trajectory indicated by the second guide line is larger than that of the parallel parking (lateral parking). This means that the turn amount of the vehicle to be driven reversely along the second guide line should be further increased. Accordingly, a second AR object 1610R' may further display, as additional information related to the second guide line, rotational degree guidance information of the vehicle (e.g., 'Turn the steering wheel all the way').

A front image 1604 of the vehicle includes a second AR object 1620R displaying the second guide line for guiding up to the target parking area in the reverse driving direction of the vehicle together with a first AR object 1620' displaying the current driving direction (forward driving) of the vehicle.

In this case, the color of the second guide line and/or a direction indicated by the guide trajectories of the second guide line may be differently displayed from the color of the first guide line and/or a direction indicated by the guide trajectory of the first guide line. Accordingly, the driver can intuitively recognize a guidance for controlling the forward and reverse driving of the vehicle.

Figure 17:
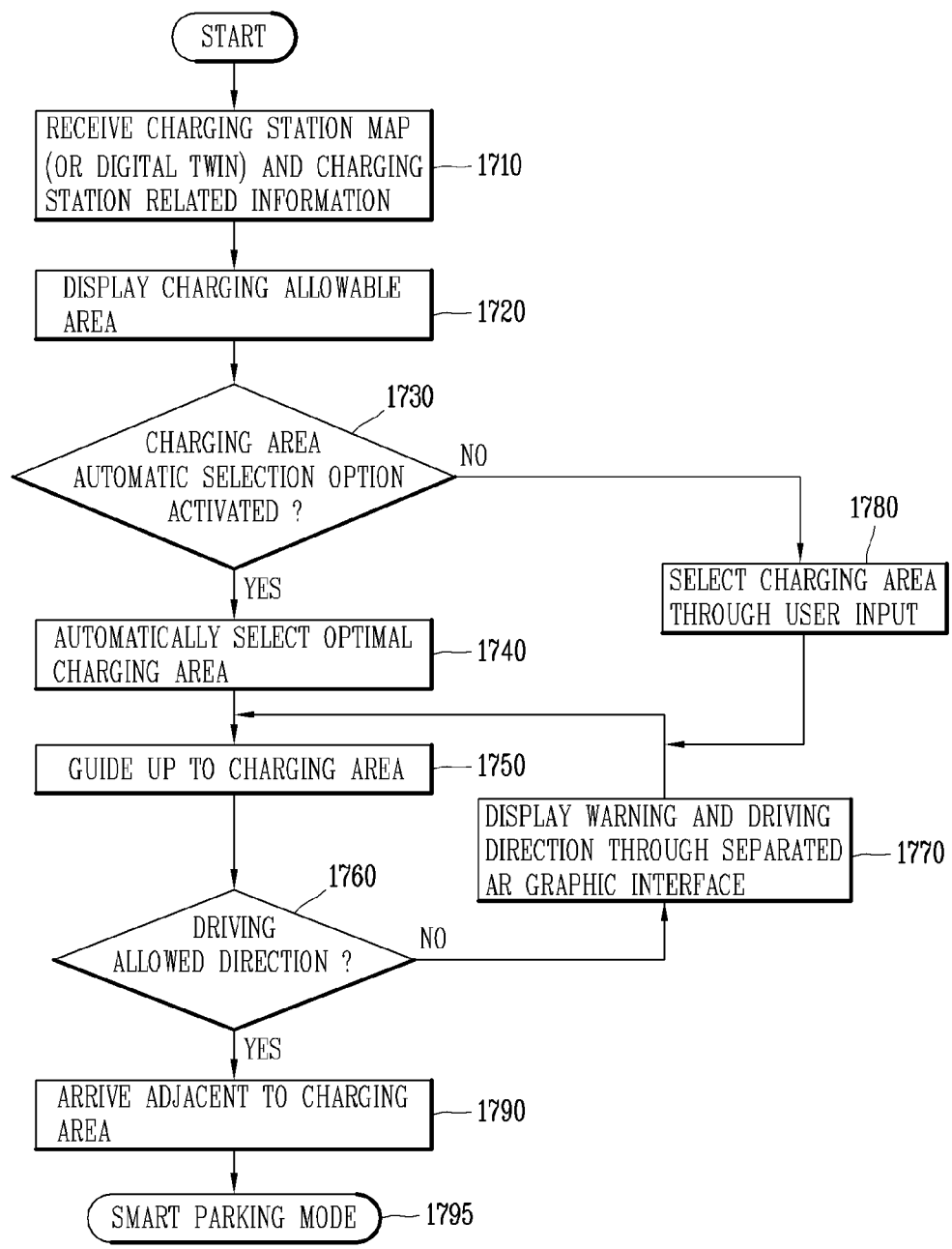
FIG. 17 is a flowchart illustrating a process of guiding a charging available area and charging through an AR graphic interface based on control information according to an embodiment of the present disclosure.
Figure 18A:
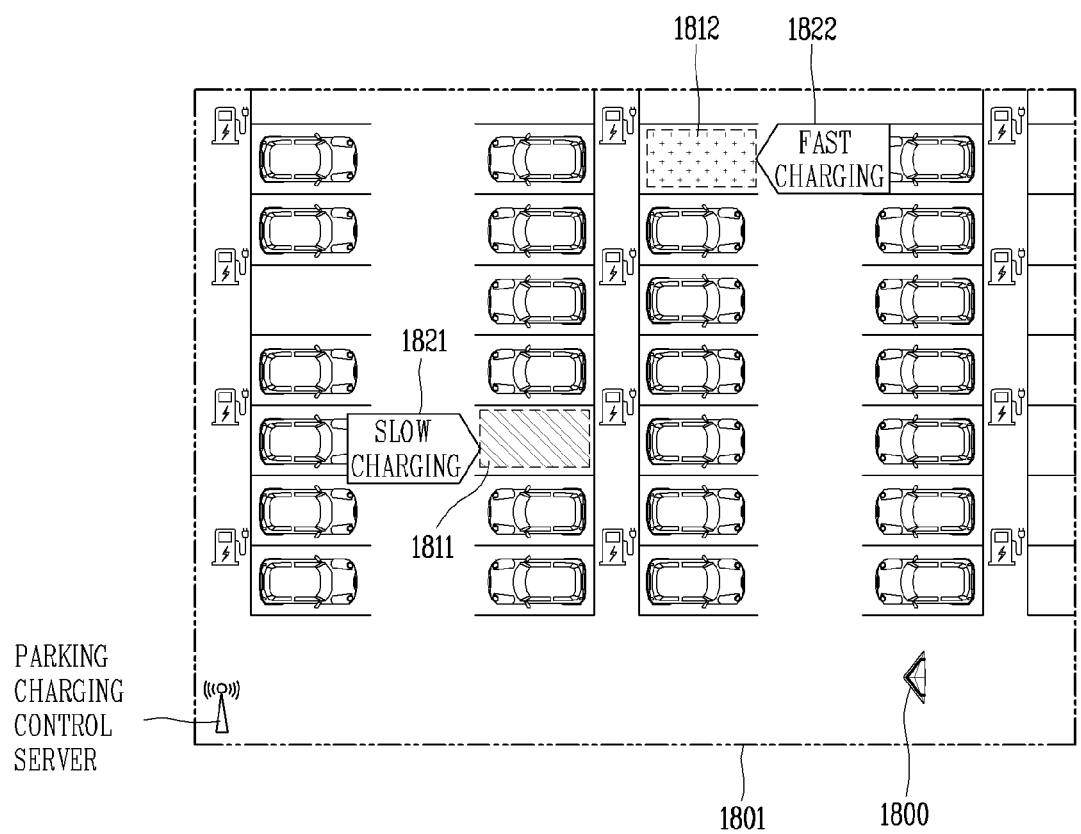
FIGS. 18A, 18B, and 18C are conceptual views referenced to explain FIG. 17.
Figure 18B:
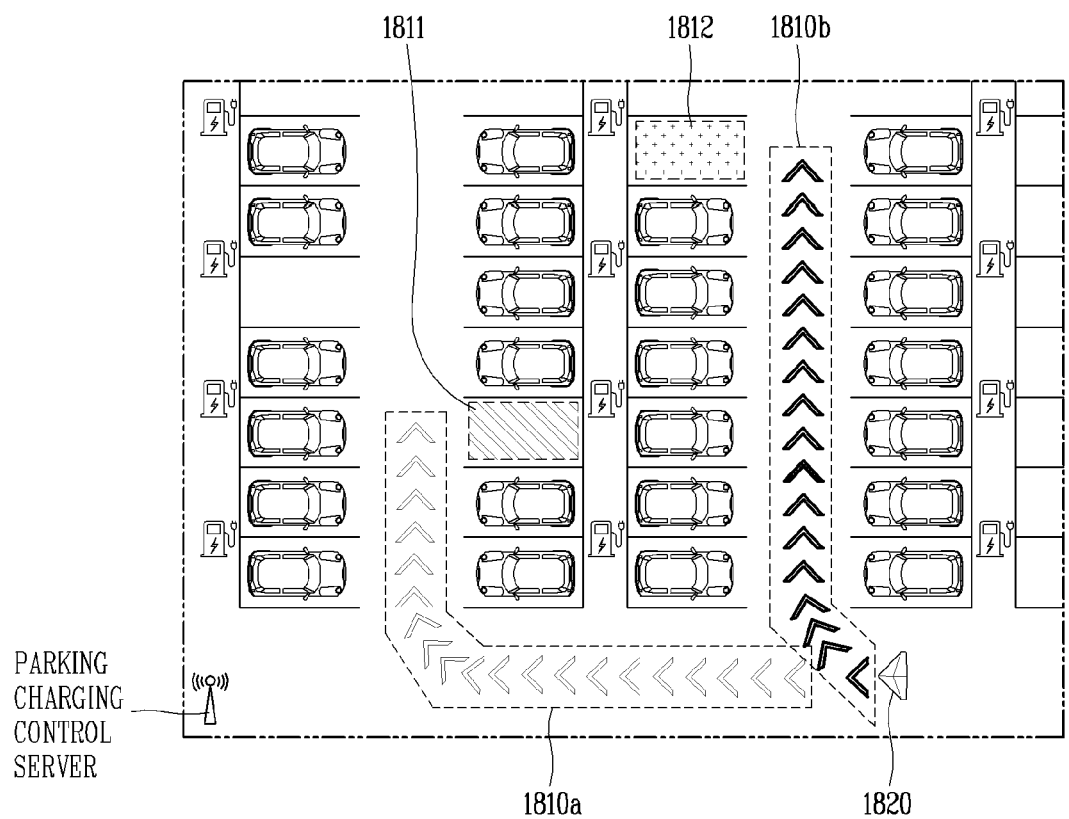
Figure 18C:
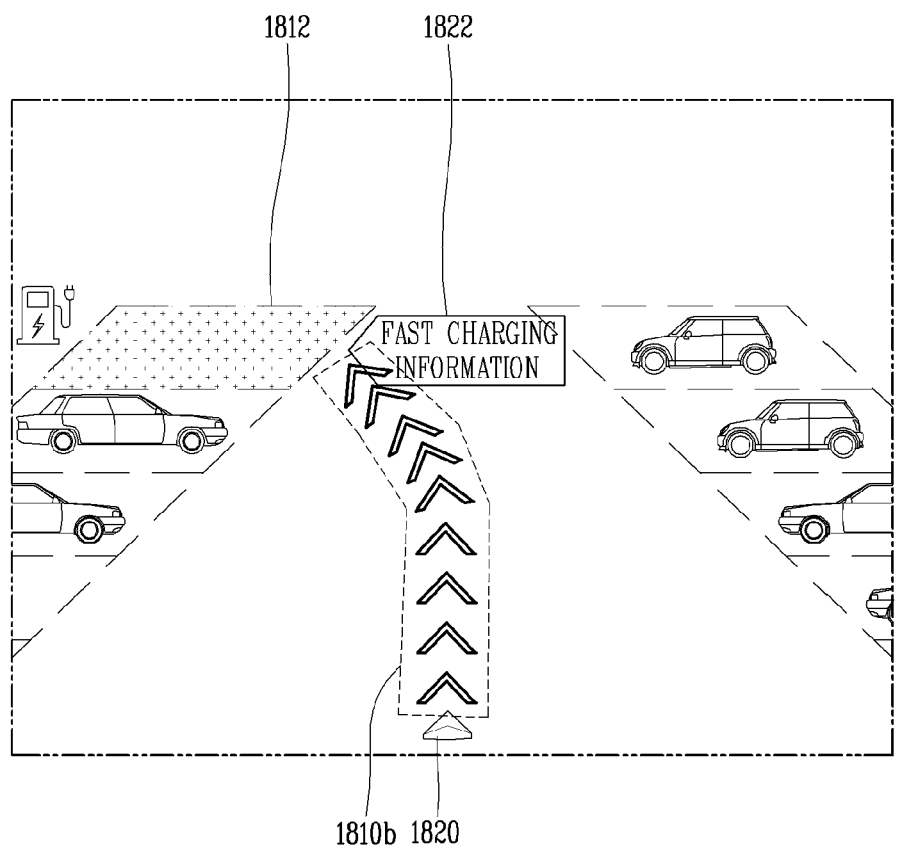

FIG. 17 is a flowchart illustrating a process of guiding a charging available area and charging through an AR graphic interface based on control information (control data) according to an embodiment of the present disclosure, and FIGS. 18A, 18B, and 18C are conceptual views referenced to explain FIG. 17.

Each step illustrated in FIG. 17 may be performed by the processor 820 of the AR display device 800 unless otherwise noted. In addition, each step may be performed by including some of the operations of the navigation engine 910, the AR engine 920, and the navigation application 930 described above with reference to FIGS. 8 to 10, or at least some of the operations may be performed before or after the steps of FIG. 17.

Referring to FIG. 17, when the vehicle enters a parking lot/charging station, the AR display device 800 according to the present disclosure may receive map data (or digital twin) of the parking lot/charging station and information related to the parking lot/charging station from a parking/charging control server (1710).

Based on the received information, the processor 820 may display a parking available area/charging available area through an AR graphic interface (1720).

Specifically, when the vehicle enters the parking lot or the charging station (parking area), the processor 820 may search for a parking available area or a charging available area based on at least one of sensing data and control data, and vary the AR graphic interface to display a location of the searched parking or charging available area. The processor 820 provides the navigation application 930 with an AR GUI frame generated based on variation information regarding the AR graphic interface, so that the navigation application 930 updates an AR GUI surface.

According to an embodiment, the processor 820 may update the AR graphic interface to display charging-related information regarding the searched charging available area. In this case, the charging-related information may include at least one of a charging method and a charging rate.

On the other hand, the processor 820 may update the AR graphic interface to display information related to a remaining charging time for each charging area adjacent to the current location of the vehicle, in response to a search failure of the charging available area.

In addition, the processor 820 may continue to search for adjacent parking spaces until the end of the search is input, in response to the search failure of the parking available area. At this time, an animation effect that the second AR object of the AR graphic interface is separated and turns 360 degrees relative to the first AR object is output to indicate that the search is in progress.

In addition, when there is no charging or parking available area as a result of the search, the processor 820 may display on the front image of the vehicle a charging waiting time for a charging area adjacent to the vehicle or a selected area through the AR graphic interface.

When a plurality of parking available areas/charging available areas are searched, the processor 820 determines whether automatic selection options have been activated (1730), and decide to display a next AR graphic interface based on a result of the determination.

When the automatic selection options have been activated, an optimal parking space/charging area is automatically selected by the parking/charging control server or the processor 820 (1740). Accordingly, notification information indicating that the optimal parking space/charging area has been automatically selected is displayed/output through the AR graphic interface.

When the automatic selection options have not been activated, the processor 820 displays the AR graphic interface including selection options for the searched plurality of parking available areas/charging available areas. Thereafter, the parking space/charging area is selected based on an input applied to the displayed selection options (1780).

When the parking space/charging area is selected, the processor 820 generates a guidance route to guide to a location of the selected parking space/charging area based on ADAS sensing data and/or control data of the parking lot/charging station (1750).

The guidance route may be implemented by guide trajectories displayed by the separated second AR object.

Specifically, the processor 820 may update the AR graphic interface such that the first AR object rotates toward the driving direction of the vehicle, and the second AR object is separated from the first AR object to display guide trajectories that connect from the first AR object to the location of the searched or selected parking space/charging area.

On the other hand, the processor 820 may determine whether the generated guidance route is in an allowed driving direction (1760). When it is not in the allowed driving direction, that is, in a prohibited entry direction, the processor 820 updates the separated second AR object to output an entry prohibition warning and display an entry direction (1770). To this end, the color, shape, blinking, and highlight effect of the separated second AR object may be changed/applied.

When the generated guidance route is in the allowed driving direction, the processor 820 displays the guidance route through the separated second AR object. When the vehicle travels along the guidance route and arrives at the corresponding parking space/charging area (1790), a smart parking mode (1795) may be executed.

The smart parking mode may be executed by the parking/charging control server in cooperation with the AR display device 800 based on GPS information, authority information (vehicle control right), vehicle information, etc. received from the vehicle or the AR display device 800 when the vehicle 100 enters the parking lot/charging station.

In addition, the processor 820 may display in real time the driving state of the vehicle and location and direction for the vehicle to be driven through the AR graphic interface while parking is performed according to the execution of the smart parking mode.

Hereinafter, an example of a UX for guiding a charging available area and a charging operation using an AR graphic interface that varies depending on control data will be described, with reference to FIGS. 18A to 18C.

According to search and detection of a location of a parking lot/charging station, the vehicle 100 may receive a guidance through an AR graphic interface up to an entrance of the searched parking lot/charging station. To this end, the AR display device 800 may search for, detect, and generate a guidance route for the location of the parking lot/charging station based on map data and ADAS sensing data.

When the vehicle 100 enters the parking lot/charging station, the parking/charging control server may sense the entry of the vehicle through its sensors (e.g., camera, lidar, radar, location sensor platform, etc.) and transmit a connection request (e.g., transmission request for GPS information, authority information (vehicle control right), vehicle information, etc.) to the AR display device 800.

When the parking/charging control server and the AR display device 800 are connected based on a response of the AR display device 800 (e.g., in response to the transmission of the GPS information, authority information (vehicle control right), vehicle information such as battery information, etc.), the AR The display device 800 may receive control data acquired through the parking/charging control server.

The control data includes map data and charging information of the parking lot/charging station.

For example, the control data may include data, information, and a program for a 3D space map of the parking lot/charging station, information related to a parking available area or an available (fast or slow) charger based on information related to an entering vehicle, real-time parking lot/charging station information (e.g., charging unit price (rate per ultra-fast/fast/slow charging), occupancy of vehicles to charge, charging waiting time, charger failure information, etc.).

The AR display device 800 may vary the AR graphic interface for parking/charging guidance based on the received control data. In addition, the parking/charging control server may generate a digital twin based on the control data and the vehicle information of the vehicle 100 and provide a parking/charging guidance using the digital twin.

In FIG. 18A, an AR graphic interface 1800 indicating the driving state of the vehicle including the current location of the vehicle (e.g., entrance of the parking lot/charging station) may be displayed on a front image 1801 of the vehicle (or through the digital twin).

The processor 820 may display a location of a searched charging available area (or parking available area) and charging information related to each charging available area through the AR graphic interface based on the control data by the parking/charging control server.

To this end, the processor 820 may receive, as the control data, charger usage patterns and information regarding ultra-fast/fast/slow chargers from the parking/charging control server.

For example, the processor 820 may display 'Slow' as charging information 1821 regarding a searched first charging available area 1811, and 'Fast' as charging information 1822 regarding a searched second charging available area 1812 on the basis of the charger usage patterns and the ultra-fast/fast/slow charger information received from the parking/charging control server.

Thereafter, the processor 820 separates the second AR object of the AR graphic interface to display, as illustrated in FIG. 18B, a guidance route 1810a for the first charging available area 1811 and a guidance route 1810b for the second charging available area 1812.

The first AR object 1820 continuously displays the current location and driving direction of the vehicle.

When a selection input (or automatic selection) for the charging available area 1811, 1812 is received, one of the guidance route 1810a for the first charging available area 1811 and the guidance route 1810b for the second charging available area 1812 is designated.

The processor 820 may provide a recommendation of a guidance route selected/suggested according to preset criteria (e.g., through a color change, highlighting, displaying of additional information, etc.), of the plurality of guidance routes 1810*a* and 1810*b*.

Here, the preset criteria for the selection may include a proximity to the current location of the vehicle, a proximity to an exit of the parking lot/charging station, fast charging priority, and the like.

For example, the guidance route 1810*b* for the second charging available area 1812 indicated by the charging information 1822 of 'Fast' in FIG. 18B may be recommended (e.g., highlighted).

When the second charging available area 1812 is selected as a charging area through the selection input according to the selection/suggestion or the automatic selection option, only the guidance path 1810*b* is output on the front image of the vehicle. Accordingly, as illustrated in FIG. 18C, the vehicle is guided to the charging area 1812 through the separated second AR object.

At this time, the guidance route 1810*b* displayed through the second AR object is generated and provided in a direction that the driver can feel easy to park the vehicle, in consideration of a parking mode to be executed later. In addition, when the current driving direction of the vehicle indicated through the first AR object 1820 is a prohibited entry direction, the processor 820 may output an entry prohibition warning and indicate an allowed entry direction (e.g., turn the guidance route 1810*b* to a direction opposite to the current driving direction) on the guidance route 1810*b* displayed through the second AR object.

When the parking mode is terminated, the processor 820 displays the AR graphic interface in the combined form of the first and second AR objects. In addition, even while a charging mode is executed after parking in the charging area 1812, the AR display device 800 may display charging information and associated information (e.g., a remaining charging time, a charging rate, events/promotions linked to the charging station, etc.) in real time on the front image of the vehicle, on the basis of the control data received from the parking/charging control server.

Then, when the end of charging of the vehicle (e.g., charging stop or charging completion) is detected, the processor 820 generates and displays a route guiding up to the exit of the parking lot/charging station through the separated second AR object based on the control data received from the parking/charging control server.

Meanwhile, the configuration described with reference to FIGS. 17 and 18A to 18C is similarly applied even when the AR display device 800 is performed based on ADAS sensing data. For example, the AR display device 800 may search for a charging available area, display a route to the searched charging available area, output charging information, display a parking guidance route according to a parking type, indicate a prohibited entry, and display a guidance route up to an exit after the end of charging.

In an AR display device and a method for operating the same according to some embodiments of the present disclosure, a current location of a vehicle and a predicted driving situation can be simultaneously guided on a front image, which is calibrated even without separate setting, using AR objects, thereby providing a more intuitive and realistic AR guidance to the vehicle. In addition, when the vehicle enters a parking lot/charging station, a search, route, and necessary information can be provided through a more intuitive AR graphic interface. An arrival in front of a selected parking space or charger can be recognized, and an AR graphic interface can be varied in real time to sequentially guide forward driving, a change point to reverse driving, and reverse driving to the vehicle in correspondence to a current driving state of the vehicle, such that the vehicle can be accurately parked in the parking space or in front of the charger. In addition, when the vehicle enters a parking lot or charging station, a route guidance for a parking/charging available area, parking/charging related information and a route guidance for an exit can be provided through a more intuitive AR graphic interface through communication with a control server of the parking lot or charging station or through ADAS sensing, thereby providing a direct and smart parking/charging related UX.

The present disclosure can be implemented as computer-readable codes (applications or software) in a program-recorded medium. The method of controlling the autonomous vehicle can be realized by a code stored in a memory or the like.

The computer readable medium includes all kinds of recording devices in which data readable by a computer system is stored. Examples of the computer-readable medium include a hard disk drive (HDD), a solid state disk (SSD), a silicon disk drive (SDD), a ROM, a RAM, a CD-ROM, a magnetic tape, a floppy disk, an optical data storage device and the like, and may also be implemented in the form of a carrier wave (e.g., transmission over the Internet). The computer may include the processor or the controller. Therefore, the detailed description should not be limitedly construed in all of the aspects, and should be understood to be illustrative. The scope of the present disclosure should be determined by rational interpretation of the appended claims, and all changes within the scope of equivalents of the present disclosure are included in the scope of the present disclosure.

The invention claimed is:

1. An augmented reality, AR, display device for a vehicle comprising:
    a receiver configured to receive image data including a front image of the vehicle, location data including a current location of the vehicle, map data relating to the current location of the vehicle and sensing data of the vehicle;
    a processor configured to activate a preset application to render an AR graphic interface overlapping the front image, the AR graphic interface including a first AR object indicating a current driving state of the vehicle and a second AR object indicating a guide for driving based on the current location of the vehicle and the map data; and
    a display configured to display the front image overlapped by the AR graphic interface according to the rendering,
    wherein the processor is further configured to:
    in response to the vehicle entering a parking area including a vehicle battery charging area, search for an area available for parking within the parking area based on at least one of the sensing data or control data of the parking area,
    separate the second AR object from the first AR object and update the AR graphic interface to guide the vehicle to the searched area through the separated second AR object, and
    recognize that the vehicle has entered in a prohibited driving direction based on the current location and driving state of the vehicle, and update the separated second AR object to output a first guide for displaying a warning notification and a second guide for guiding an allowed driving direction, wherein the separated second AR includes a plurality of fragments, and wherein a fragment of the plurality of fragments that is closest to the first AR object provides a guide to be associated with the current driving state indicated by the first AR object.

2. The AR display device of claim 1, wherein the processor is configured to render a third AR object to a location of the searched area on the front image of the vehicle, the third AR object displaying the searched area to be selected by a user input, and update the AR graphic interface, in response to selection of the searched area through the third AR object, such that the separated second AR object displays a guidance toward the selected parking area of the front image.

3. The AR display device of claim 2, wherein the processor is configured to determine an available parking type based on the vehicle being within predetermined distance of the selected parking area-, and update the AR graphic interface according to the determination such that the separated second AR object displays a parking guide line for the vehicle to be driven.

4. The AR display device of claim 3, wherein the processor is configured to:

in response to the determination of the available parking type, calculate a change point to reverse driving based on the current location of the vehicle and a location of the selected parking area, and display a first guide line toward the change point through the separated second AR object, and update the AR graphic interface to display a second guide line for the vehicle to travel backward into the selected parking area through the separated second AR object, in response to the current location of the vehicle corresponding to the first AR object being close to the change point.

5. The AR display device of claim 1, wherein the processor is configured to update the AR graphic interface to be displayed in a manner that the separated second AR object is joined to the first AR object, in response to an end of the search.

6. The AR display device of claim 1, wherein the processor is configured to update the AR graphic interface to display a location of the parking available area, re-searched based on the sensing data and the control data, in a peripheral area in the allowed driving direction.

7. The AR display device of claim 1, wherein the processor is configured to:

in response to the vehicle entering the parking area, determine whether the vehicle battery needs to be charged based on the sensing data of the vehicle, determine that the vehicle battery needs charging, search for an area for charging within the charging area based on at least one of the sensing data and the control data, and update the AR graphic interface to display a location of the searched charging area.

8. The AR display device of claim 7, wherein the processor is configured to update the AR graphic interface to display charging-related information regarding the searched charging area on the front image, wherein the charging-related information includes at least one of a charging method and a charging rate.

9. The AR display device of claim 7, wherein the processor is configured to update the AR graphic interface to display information related to a remaining charging time for each charging area adjacent to the current location of the vehicle, in response to failure of the search.

10. The AR display device of claim 1, wherein the processor is configured to update the AR graphic interface such that the first AR object is rotated to a driving direction of the vehicle, and the separated second AR object displays guide trajectories from the first AR object toward a location of the searched area.

11. The AR display device of claim 10, wherein the guide trajectories for the searched area indicate a guidance route generated based on at least one of Advanced Driver Assistance Systems (ADAS) sensing data of the vehicle and the control data of the parking area.

* * * * *